United States Patent [19]
Minami et al.

[11] Patent Number: 6,021,239
[45] Date of Patent: Feb. 1, 2000

[54] PHOTOCOUPLER AND METHOD FOR PRODUCING THE SAME

[75] Inventors: Kohji Minami, Gose; Yukio Kurata, Tenri; Hisato Uetsuka; Hirobumi Ouchi, both of Hitachi, all of Japan

[73] Assignees: Sharp Kabushiki Kaisha, Osaka; Hitachi Cable, Ltd., Tokyo, both of Japan

[21] Appl. No.: 08/960,417

[22] Filed: Oct. 29, 1997

[30] Foreign Application Priority Data

Oct. 31, 1996 [JP] Japan ................................ 8-290899

[51] Int. Cl.$^7$ ...................................................... G02B 6/26
[52] U.S. Cl. .......................... 385/36; 385/43; 385/147; 385/130; 385/131; 359/900
[58] Field of Search ................... 385/36, 37, 129, 385/130, 131, 14, 43; 359/900

[56] References Cited

U.S. PATENT DOCUMENTS

| | | | |
|---|---|---|---|
| 4,637,684 | 1/1987 | Tomita et al. | 350/96.19 |
| 4,932,743 | 6/1990 | Isobe et al. | 350/96.19 |
| 5,199,452 | 4/1993 | Yokomori et al. | 385/36 |
| 5,208,800 | 5/1993 | Isobe et al. | 385/37 |
| 5,235,589 | 8/1993 | Yokomori et al. | 385/36 |

FOREIGN PATENT DOCUMENTS

| | | |
|---|---|---|
| 4-289531 | 10/1992 | Japan . |
| 5-45532 | 2/1993 | Japan . |

*Primary Examiner*—Hung N. Ngo
*Attorney, Agent, or Firm*—David G. Conlin; George W. Neuner; Dike, Bronstein, Roberts & Cushman, LLP

[57] ABSTRACT

A photocoupler according to the present invention includes: an optical waveguide including a substrate, at least a first dielectric layer provided on the substrate, the first dielectric layer having a tapered structure whose thickness varies in an x-direction in which light is propagated after coupling, and a second dielectric layer provided on the first dielectric layer; a light incidence component provided above the optical waveguide, which causes light incident thereon to be directed toward a surface of the optical waveguide at a prescribed angle; and a bonding section for bonding the light incidence component to the optical waveguide. The bonding section has an edge surface which makes contact with the surface of the waveguide in a straight line and has a portion which makes contact with neither the light incidence component nor the surface of the optical waveguide. The tapered structure of the first dielectric layer has a shape set such that a radiation pattern of light with a wavelength $\lambda$ output from the optical waveguide of the photocoupler fulfills the following expression:

$$a_{n-1}(1-r_n) < a_n(1-r_{n+1})$$

where $\alpha_{rn}$ is a radiation coefficient at a section $X_{n-1} < X < X_n$ of the first dielectric layer where a thickness thereof varies in a tapering manner; $a_n$ is an amplitude at a distance $X_n$ from the edge surface of the bonding section; and $r_n$ is $\exp(k_0 \alpha_{rn} \Delta X)$; $k_0$ is $2\pi/\lambda$; and $\Delta X$ is $X_n - X_{n-1}$.

11 Claims, 21 Drawing Sheets d=320[nm]  D=570[nm]  s=350[nm]
L=30[μm]

Remove the photoresist s=230[nm]  D=570[nm]  L=30[μm]

PHOTOCOUPLER AND METHOD FOR PRODUCING THE SAME

BACKGROUND OF THE INVENTION

1. Field of the Invention

The present invention relates to a photocoupler used for optically coupling between an optical waveguide type optical pick-up device and an optical waveguide device, and a method for producing the same.

2. Description of the Related Art

Conventionally, a photocoupler provided with a prism for introducing incident light to an optical waveguide having no tapered structure is generally known.

Recently, there have been demands for an optical waveguide type optical pick-up device with an even smaller beam spot diameter for realizing recording/reproduction of higher density. However, a photocoupler mounted on an optical waveguide type optical pick-up device has a problem that an allowable incident position area with respect to a coupling efficiency becomes smaller as an incident beam diameter becomes smaller (i.e., a beam spot diameter of 30 μm or less). This problem has to be solved in order to meet the demands of smaller beam spot diameter.

A prism coupler shown in FIG. 20 is disclosed in Japanese Laid-Open Publication No. 4-289531 for solving the above-described problem. In the above-mentioned prism coupler, an allowable incident position area with respect to coupling characteristics is enlarged by varying a propagation constant (a value having a real part representing a phase constant and an imaginary part representing an attenuation constant, which is determined by a film thickness and a refractive index of the optical waveguide) along a direction of light propagation of the optical waveguide. Specifically, the above-mentioned prism coupler employs a second gap layer 104 with a tapered structure shown in FIG. 20.

The prism coupler includes a substrate (Si substrate) 101, an SiO$_2$ layer 107, an optical waveguide layer 102, a first gap layer 103 which acts as an air gap and the second gap layer 104 with the tapered structure provided in this order. A prism 106 is bonded to the tapered second gap layer 104 via a bonding section (adhesive) 105.

FIG. 21 is a cross-sectional view showing a prism coupler including a prism 304 which is in pressure contact with an optical waveguide 305. The optical waveguide 305 includes a substrate 303, a first dielectric layer 301 and a second dielectric layer 302. An edge (edge surface) 306 of the prism 304 has the same function as the second gap layer 104 shown in FIG. 20.

A photocoupler such as a prism coupler exhibits the highest efficiency for incident light that matches a radiation pattern of outgoing light from the photocoupler. The actual radiation pattern (i.e., an intensity distribution of the outgoing light from the photocoupler) is difficult to analyze. Therefore, herein, a "radiation pattern" is assumed to be approximated by an amount of change in the amplitude of the propagating light in every microscopic section Δx traced in a certain direction (e.g., in a propagation direction).

Therefore, a radiation pattern of outgoing light from the prism coupler shown in FIG. 20 is controlled to have a desired shape by tapering the second gap layer 104. Specifically, the second gap layer 104 is tapered (with a gentle slope of 1:1000 or more) such that the prism coupler almost uniformly outputs light with a uniform intensity in a direction of propagation of the optical waveguide (in other words, a radiation pattern has a shape such that the intensity thereof is generally uniform regardless of variations in the incident positions), thereby enhancing the coupling efficiency for the incident beam having a relatively large beam diameter.

Another conventional prism coupler is disclosed in Japanese Laid-Open Publication No. 5-45532 and is shown in FIG. 22. This prism coupler is provided with a tapered optical waveguide layer (guiding layer).

Although the specification of the Japanese Laid-Open Publication No. 5-45532 does not describe about enhancing the coupling characteristics of the prism coupler, there is a possibility that an allowable incident position area with respect to the coupling characteristics for incident light may be enlarged in the prism coupler shown in FIG. 22.

The optical waveguide of the prism coupler shown in FIG. 22 includes a substrate 201 and an optical waveguide layer 202 having a tapered portion formed thereon. A prism 204 having a gap layer 205 formed on the bottom surface 206 thereof (which will make direct contact with the optical waveguide) is bonded to the optical waveguide with an adhesive 203 having a refractive index generally equal to that of the optical waveguide layer 202.

As described above, in the prism coupler shown in FIG. 20, the radiation pattern is intentionally changed by partially tapering the second gap layer 104 into a gentle slope. In the case where the prism coupler shown in FIG. 20 is used as a photocoupler for a light beam with a small beam diameter (while adjusting the slope of the tapered portion), a distance between an edge 111 of the bonding section 105 and an edge 110 of the tapered portion (i.e., a boundary between a tapered portion and a flat portion) of the second gap layer 104 will have an influence on the coupling characteristics to some degree.

Since the prism coupler shown in FIG. 20 has no factor of defining the edge 111 of the bonding section 105 to make contact with the top surface of the optical waveguide in a straight line, the distance between the edge 111 of the bonding section 105 and the edge 110 of the tapered portion of the second gap layer 104 cannot be accurately positioned in order to optimize the coupling efficiency. Accordingly, the prism coupler shown in FIG. 20 has a problem that when it is used for a light beam with a small beam diameter, it is difficult to enlarge the allowable incident position area with respect to the coupling efficiency while restraining reduction in the coupling efficiency.

Furthermore, the thickness of the waveguide device needs to be increased for tapering the second gap layer 104 in order to obtain a desired radiation pattern of outgoing light from the prism coupler. Accordingly, freedom of the device design may be limited or a membrane stress may be increased which disturbs precise production of the prism coupler.

On the other hand, in the case of the prism coupler shown in FIG. 22, simply providing the optical waveguide layer 202 with a tapered structure does not enlarge the allowable incident position area with respect to the coupling characteristics for the following reason.

A photocoupler exhibits a higher coupling efficiency for incident light with a phase and an intensity distribution closer to the radiation characteristics (the radiation pattern) of outgoing light from the photocoupler which is in use. The tapered structure of the optical waveguide layer 202 will produce either a monotonous decreasing type radiation pattern or a varied type radiation pattern, both shown in FIG. 23. The monotonous decreasing type radiation pattern is also obtained when the optical waveguide layer is not tapered.

The monotonous decreasing type radiation pattern undesirably allows the coupling efficiency to be easily changed in accordance with the change in the incident position of light after the light is coupled to the optical waveguide in the propagation direction of the light. Therefore, an allowable incident position area in the case of the monotonous decreasing type radiation pattern would be smaller than that of the varied type radiation pattern. In order to enlarge the allowable incident position area with respect to the coupling characteristics, the photocoupler preferably maintains the intensity of the radiation pattern to be constant in spite of the changes in the incident position. Accordingly, the varied type radiation pattern having a maximum point in the midway with gentle curves declining on both sides is preferable.

However, since the tapered portion of the prism coupler shown in FIG. 22 is not defined taking the above-described point in consideration, there is a problem that the allowable incident position area with respect to the coupling efficiency cannot be increased.

In addition, in the case of the prism coupler shown in FIG. 22, the prism 204 with the gap layer 205 is bonded to the optical waveguide with the adhesive 203 having the same refractive index as the optical waveguide layer 202. As a result, when an alignment error is caused between the prism 204 having the gap layer 205 and the optical waveguide, the alignment error will proportionally result in an offset from an optimum relative positions (for obtaining the maximum coupling efficiency) between the edge 208 of the prism 204 and the edge 207 of the tapered portion of the optical waveguide layer 202.

Moreover, in the case of the photocoupler shown in FIG. 22, since the thickness of the bonding section 203 is difficult to control and the straightness thereof is not guaranteed, it is difficult to optimize the distance between the edge 208 of the prism 204 and the edge 207 of the tapered portion of the optical waveguide layer 202. As a result, it is difficult to enlarge the allowable incident position area with respect to the coupling efficiency while restricting the reduction in the coupling efficiency.

Thus, conventionally, prism couplers have a problem of not being able to accommodate a smaller beam spot diameter which is required for realizing recording/reproduction with higher density.

SUMMARY OF THE INVENTION

In accordance with one aspect of the present invention, a photocoupler includes: an optical waveguide including a substrate, at least a first dielectric layer provided on the substrate, the first dielectric layer having a tapered structure whose thickness varies in an x-direction in which light is propagated after coupling, and a second dielectric layer provided on the first dielectric layer; a light incidence component provided above the optical waveguide, which causes light incident thereon to be directed toward a surface of the optical waveguide at a prescribed angle; and a bonding section for bonding the light incidence component to the optical waveguide. The bonding section has an edge surface which makes contact with the surface of the waveguide in a straight line and has a portion which makes contact with neither the light incidence component nor the surface of the optical waveguide. The tapered structure of the first dielectric layer has a shape set such that a radiation pattern of light with a wavelength λ output from the optical waveguide of the photocoupler fulfills the following expression (1):

$$a_{n-1}(1-r_n) < a_n(1-r_{n+1}) \qquad \text{expression (1)}$$

where $\alpha_{rn}$ is a radiation coefficient at a section $X_{n-1} < X < X_n$ of the first dielectric layer where a thickness thereof varies in a tapering manner; $a_n$ is an amplitude at a distance $X_n$ from the edge surface of the bonding section; and $r_n$ is $\exp(k_o \alpha_{rn} \Delta X)$; $k_o$ is $2\pi/\lambda$; and $\Delta X$ is $X_n - X_{n-1}$.

According to one embodiment of the present invention, the shape of the tapered structure is set such that a taper length t of the tapered structure, a thickness s of the second dielectric layer, a maximum thickness D of the first dielectric layer and a minimum thickness d of the first dielectric layer fulfill the following conditions:

5 [μm]<t<15 [μm], 300 [nm]<s<400 [nm],

540 [nm]<D<600 [nm], 320 [nm]<d<400 [μm].

According to another embodiment of the present invention, a height h of the edge surface of the bonding section from the surface of the optical waveguide is set so as to fulfill the following expression (2):

$$h > 2r_A / \sin \theta_1' \qquad \text{expression (2)}$$

where $r_A$ is an Airy radius of an incident beam spot and $\theta_1'$ is an incidence angle with respect to the surface of the optical waveguide.

According to still another embodiment of the present invention, the light incidence component is a prism.

According to yet still another embodiment of the present invention, the light incidence component is a dielectric plate.

According to another embodiment of the present invention, the surface of the dielectric plate is provided with a non-reflective coating.

In another aspect of the present invention, a method for producing a photocoupler includes the steps of: applying a photoresist on a surface of the optical waveguide; forming a groove in the photoresist; injecting an adhesive into the groove; positioning and adjusting a light incidence component on the surface of the photoresist; bonding and fixing the light incidence component on the surface of the optical waveguide; and removing the photoresist.

In still another aspect of the present invention, a method for producing a photocoupler includes the steps of: applying a photoresist on a surface of the optical waveguide; forming a groove in the photoresist; injecting an adhesive into the groove; positioning and adjusting the prism on the surface of the waveguide structure crossing over the groove; bonding and fixing the prism on the surface of the optical waveguide; and removing the photoresist.

In another aspect of the present invention, the thickness W of the photoresist is set to fulfill the relationship:

w>h where, h is a height of the edge surface of the bonding section from the surface of the waveguide.

According to one embodiment of the present invention, the method for producing a photocoupler further includes, after the step of forming a groove in the photoresist, a step of performing an RIE process on the surface of the waveguide.

According to another aspect of the present invention, the step of bonding and fixing the light incidence component on the surface of the waveguide is performed using a photocurable adhesive.

Thus, the invention described herein makes possible the advantages of providing (1) a photocoupler for accommodating a smaller beam spot diameter which is required for realizing recording/reproduction with higher density, by enlarging an allowable incident position area for light incident to the photocoupler with respect to a coupling efficiency while restraining a reduction in the coupling efficiency, and (2) a method for producing such a photocoupler.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative, but not limiting, examples with reference to the accompanying drawings.

In the present specification, a term "tapered" refers both to a line connecting between points on a surface of a first dielectric layer at a portion with a minimum thickness and a portion with a maximum thickness, and to the continuously varying thickness of the first dielectric layer.

Figure 1:
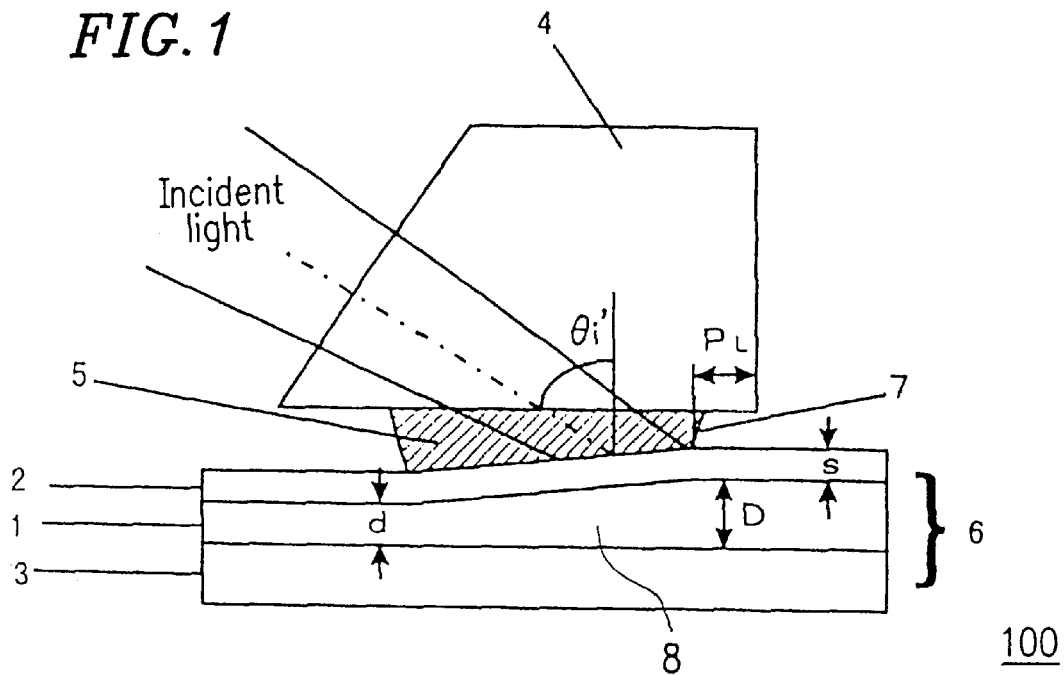
FIG. 1 is a cross-sectional view showing a photocoupler according to a first example of the present invention.

FIG. 1 is a cross-sectional view showing a structure of a prism coupler according to a first example of the present invention which includes an optical waveguide 6 and a prism 4 bonded thereon with an adhesive (bonding section) 5. The optical waveguide 6 includes a substrate 3, a first dielectric layer 1 having a tapered portion and a second dielectric layer 2 formed on the first dielectric layer 1. The prism 4 makes light to be incident on the surface of the optical waveguide 6 at a prescribed angle.

The taper shape of the first dielectric layer 1 is determined so as to satisfy the following expression (1):

$$a_{n-1}(1-r_n) < a_n(1-r_{n+1}) \qquad \text{expression (1)}$$

where $\alpha_m$ is a radiation coefficient at a section $X_{n-1} < X < X_n$ of the first dielectric layer where a thickness thereof varies in a tapering manner; $a_n$ is an amplitude at a distance $X_n$ from the edge surface of the bonding section; $r_n$ is exp $(k_0 \alpha_m \Delta X)$; $k_0$ is $2\pi/\lambda$; and $\Delta X$ is $X_n - X_{n-1}$.

Figure 2:
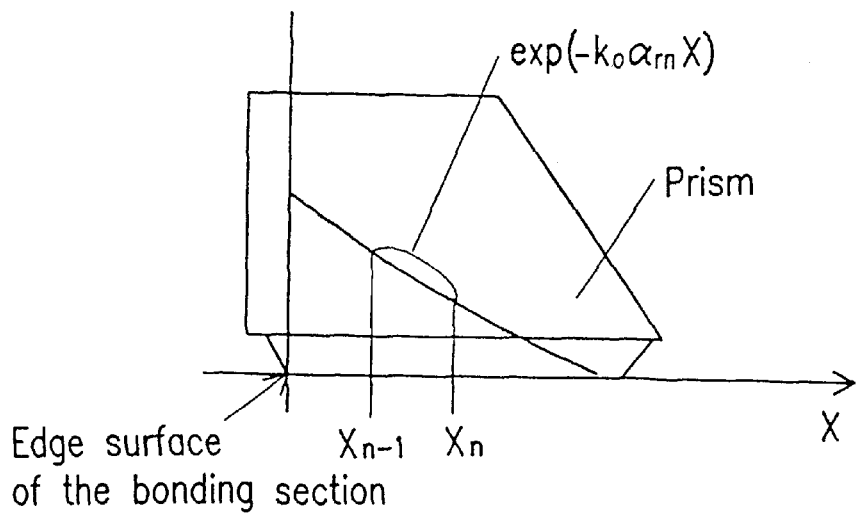
FIG. 2 is a schematic view illustrating a variable $r_n$ of an expression (1)

Moreover, FIG. 2 is a schematic view illustrating a variable $r_n$ of the expression (1). The variable $r_n$ represents an amplitude attenuation factor of light which propagates in the waveguide (prism coupler) with respect to the propagation distance $\Delta X$, namely an attenuation factor of a field intensity of light propagating between a section $X_{n-1}$–$X_n$.

Figure 23:
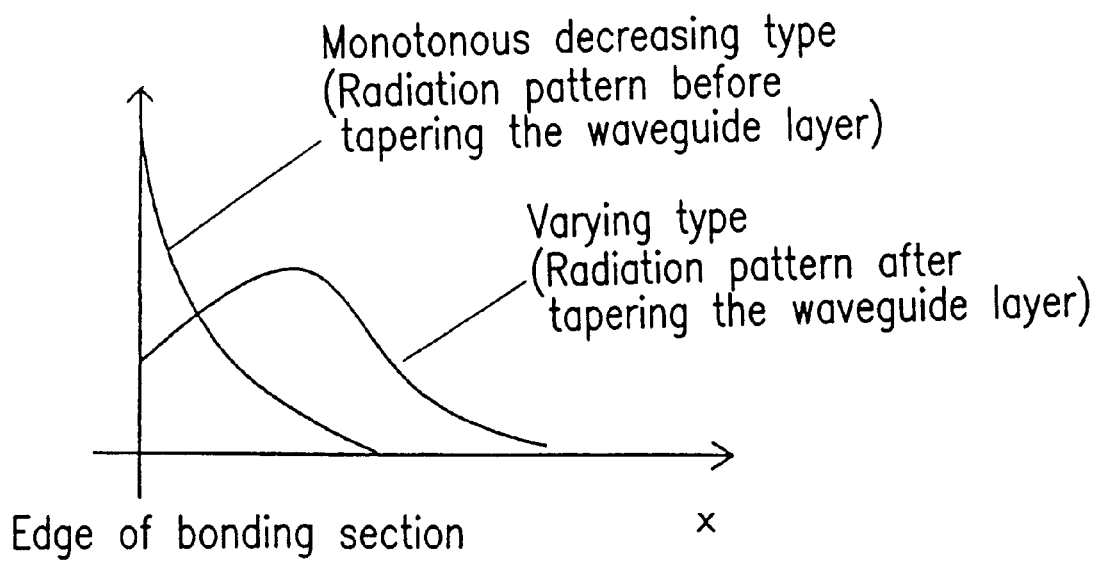
FIG. 23 is a graph showing types of radiation patterns.

If the taper shape is determined so as to satisfy the expression (1), a varied type radiation pattern shown in FIG. 23 is obtained for the reason described later.

A radiation coefficient $\alpha_m$ is obtained as one of imaginary parts of the complex solutions $\beta_{TE}$ and $\beta_{TM}$ of an expression (equation) (3).

Expression (Equation) (3)

$$\det|C| = 0,$$

$$|C| = \begin{vmatrix} \exp(-j\kappa_b h) & -\exp(-j\kappa_0 h) & -\exp(j\kappa_0 h) & 0 & 0 & 0 & 0 & 0 \\ -\rho_b\exp(-j\kappa_b h) & \rho_0\exp(-j\kappa_0 h) & -\rho_0\exp(j\kappa_0 h) & 0 & 0 & 0 & 0 & 0 \\ 0 & 1 & 1 & -1 & -1 & 0 & 0 & 0 \\ 0 & -\rho_0 & \rho_0 & \rho_2 & -\rho_2 & 0 & 0 & 0 \\ 0 & 0 & 0 & \exp(j\kappa_2 s) & \exp(-j\kappa_2 s) & -\exp(j\kappa_1 s) & -\exp(-j\kappa_1 s) & 0 \\ 0 & 0 & 0 & -\rho_2\exp(j\kappa_2 s) & \rho_2\exp(-j\kappa_2 s) & \rho_1\exp(j\kappa_1 s) & -\rho_1\exp(-j\kappa_1 s) & 0 \\ 0 & 0 & 0 & 0 & 0 & \exp(j\kappa_1 u) & \exp(-j\kappa_1 u) & -\exp(-j\kappa_s u) \\ 0 & 0 & 0 & 0 & 0 & -\rho_1\exp(j\kappa_1 u) & \rho_1\exp(-j\kappa_1 u) & -\rho_s\exp(-j\kappa_s u) \end{vmatrix}$$

where u=s+q
and for TE polarized light:

$$\kappa_i = k_0\sqrt{n_i^2 - \beta_{TE}^2}$$

$$\rho_i = \kappa_i$$

and for TM polarized light:

$$\kappa_i = k_0\sqrt{n_i^2 - \beta_{TM}^2}$$

$$\rho_i = \kappa_i/n_i^2$$

where i=b, a, 2, 1 and s (b, a, 2, 1 and s correspond to the subscripts used in the refractive indices, respectively)

Figure 21:
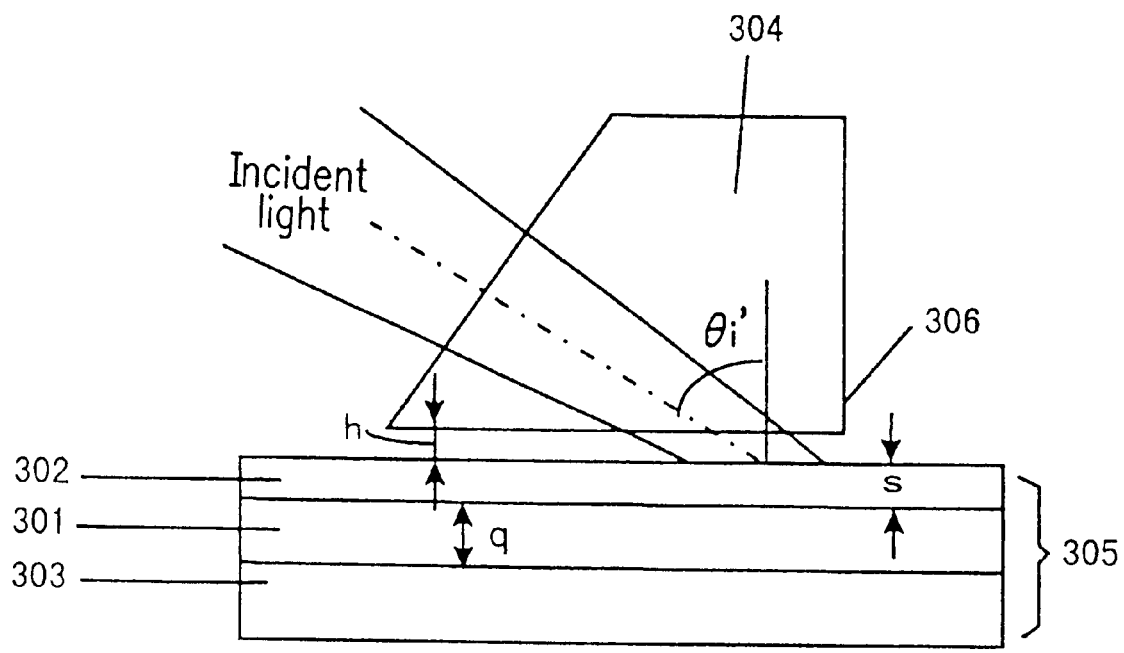
FIG. 21 is a cross-sectional view showing another example of a conventional photocoupler.
Figure 22:
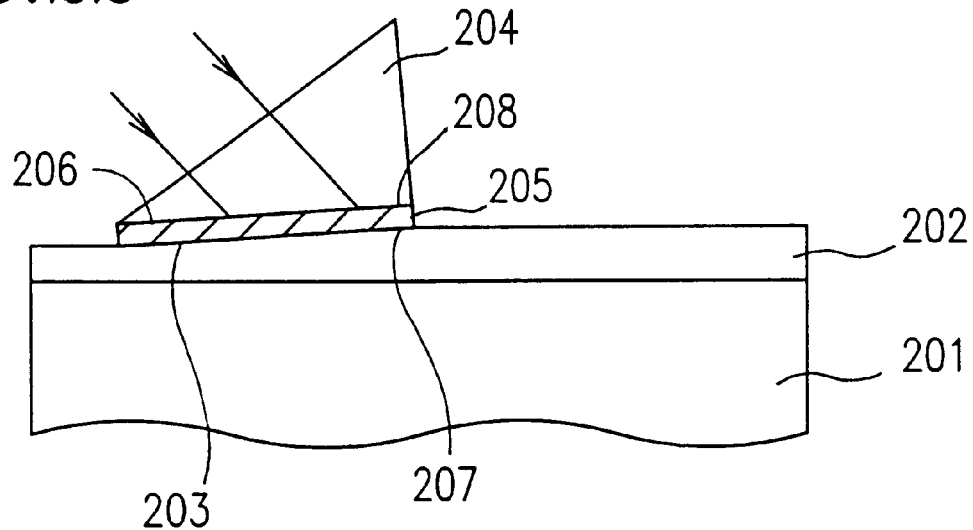
FIG. 22 is a cross-sectional view showing yet another example of a conventional photocoupler.

The above expression (3) applies to a prism coupler shown in FIG. 21 which includes the optical waveguide 305 and the prism 304 having a refractive index $n_b$, where the optical waveguide 305 includes the substrate 303 having a refractive index $n_s$, the first dielectric layer 301 having a thickness q and a refractive index $n_1$ and the second dielectric layer 302 having a thickness s and a refractive index $n_2$. In the case of the prism coupler 100 shown in FIG. 1, a radiation coefficient $\alpha_{rn}$ at the section ($x_{n-1}$<x<$x_n$, FIG. 2) of the tapered portion 8 of the first dielectric layer 1 can be obtained as one of the solutions of expression (3) by substituting an average thickness $d_n$ of the section for q, where h=0 (assuming that the prism 304 is replaced by the bonding section 5). Hereinafter, a variable $n_b$ will be used to denote a refractive index of the bonding section 5.

Furthermore, the coupling efficiency of the photocoupler depends on the degree of matching of a profile of the incident light beam (the shape of the Gaussian distribution of the amplitude) with the radiation pattern of outgoing light from the photocoupler, and a degree of phase shift between a phase constant of incident light and a phase constant unique to the photocoupler (a real part of the solution of expression (3)). Specifically, the coupling efficiency of the photocoupler can be approximated by overlapping integration of (i) a function obtained by multiplying a radiation pattern shown in FIG. 23 by a phase component exp {–jB(x)x} and (ii) a function $f_i(x)$ that contributes to the amplitude distribution of the incident light beam. Herein, B(x) is a function representing changes of a real part of the complex solutions $\beta_{TE}$ or $\beta_{TM}$ in a x-direction and the function $f_i(x)$ is represented by the following expression (4).

$$f_i(x)=\exp(-jk_0 n_b \sin\theta_i'x - 4x^2/L^2) \quad \text{expression (4)}$$

where, $\theta_i'$ is an incidence angle to a surface of an optical waveguide, $W_e$ is an incident light beam diameter at a light intensity of $1/e^2$ and L is $W_e/\cos\theta_i'$.

Therefore, if a photocoupler can be made to exhibit a varied type radiation pattern shown in FIG. 23 such that the radiation pattern is generally uniform along the direction of light propagating in the optical waveguide 6, the allowable incident position area on the optical waveguide 6 with respect to the coupling efficiency can be enlarged.

In the photocoupler according to the present invention, the adhesive forming the bonding section, the substrate, the first dielectric layer and the second dielectric layer are usually made of materials having reflective indices of 1.56 to 1.58, 1.44 to 1.46, 1.52 to 1.56, and 1.42 to 1.44, respectively. In this case, in order to realize the above-described advantageous photocoupler, a taper length t, a thickness s of the second dielectric layer, a maximum thickness D and a minimum thickness d of the first dielectric layer are set so as to satisfy the following conditions, 5 [μm]<t<15 [μm],
300 [nm]<s<400 [nm],
540 [nm]<D<600 [nm], and
320 [nm]<d<400 [nm]

Figure 3A:
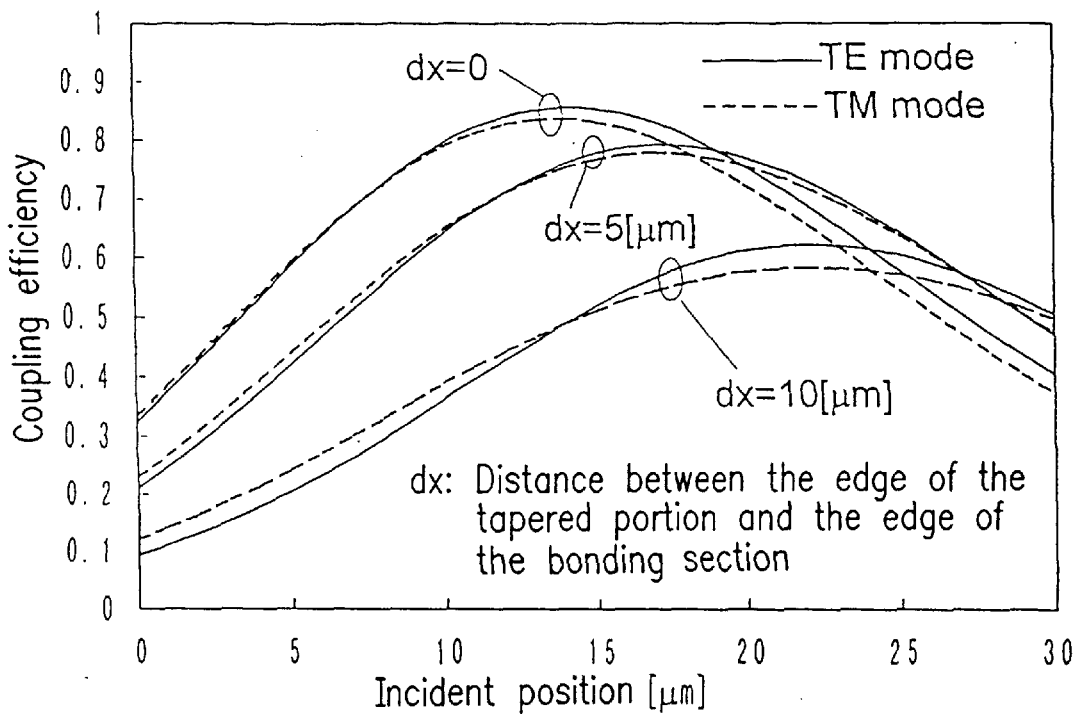
FIG. 3A is a graph showing incident position characteristics with respect to coupling efficiency determined by distance between the edge of the tapered portion and the edge of the bonding section.

According to the present invention, the edge surface 7 of the bonding section 5 has a portion which makes contact with neither the light incidence component 4 nor the surface of the optical waveguide 6 and has a portion which makes contact with the top surface of the optical waveguide 6 in a straight line. Accordingly, the distance between the edge of the tapered portion of the first dielectric layer 1 and the contact line between the edge surface 7 of the bonding section 5 and the surface of the optical waveguide 6 can be determined correctly. Therefore, the value dx representing a degree of shift from the optimum distance between the edge of the tapered portion of the first dielectric layer 1 and the edge surface 7 of the bonding section can be easily reduced to zero. As a result, the loss of the coupling efficiency can be minimized as shown in FIG. 3A. The coupling characteristics shown in FIG. 3A were obtained under the conditions illustrated in FIG. 3B.

By setting the height h of the edge surface 7 of the bonding section 5 from the top surface of the waveguide 6 so as to satisfy the above-described expression (2) using the prism as the light incidence component, the bonding section is completely prevented from acting as a thin film that causes an unstable coupling efficiency due to multiple reflection at the interface between the adhesive and the bottom surface of the prism. Details are described later.

According to the present invention, the light incidence component may be a dielectric plate which is easier to produce than to produce a prism, thereby reducing the production cost.

Furthermore, the surface of the dielectric plate may be provided with a non-reflective coating, so as to reduce the reflectance of light.

Moreover, according to a method for producing a photocoupler of the present invention, the position of the contact line where the edge portion of the adhesive and the surface of the optical waveguide make contact with each other may be adjusted with respect to the edge of the tapered portion of the first dielectric layer by photolithography. Thus, the distance between the line where the edge of the bonding section makes contact with the surface of the optical waveguide, and the edge of the tapered portion of the first dielectric layer can be accurately set. Furthermore, the straightness of the line between the edge of the bonding section and the surface of the optical waveguide can be realized using photolithography.

Figure 4:
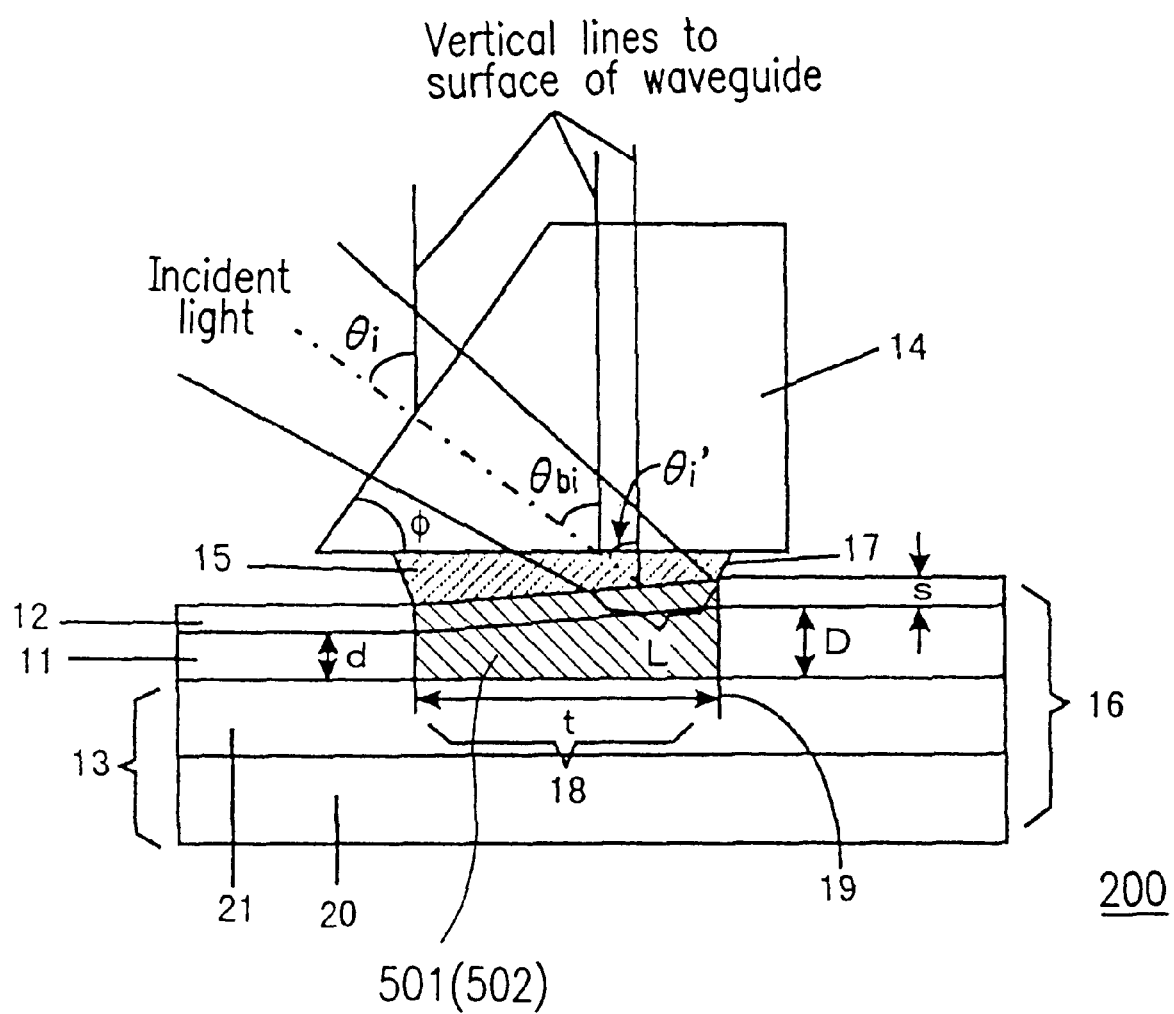
FIG. 4 is a cross-sectional view showing a photocoupler according to a second example of the present invention.

According to the present invention, a grooved photoresist is provided on a surface of the waveguide and the prism is positioned on the photoresist so as to cross over the groove. By doing so, the prism will make contact with the photoresist at two positions, whereby the bottom surface of the prism is placed in a more parallel relationship with the surface of the waveguide. The base angle φ of the prism (which is determined to minimize the reflectance of the light which is incident at such an optimum incidence angle that maximizes the coupling efficiency) is restricted from being offset with respect to the angle between the surface of the waveguide and the incidence angle. Thus, the reduction in the coupling efficiency which is caused by the offset of the incidence angle with respect to the optimum incidence angle is minimized. Herein, assuming that the parallel-plane prism is a parallelopiped prism, the base angle φ refers to the angle formed by the sides of the parallelogram side surface of the prism (FIG. 4).

By setting the thickness W of the photoresist to be greater than a height h of the edge surface of the bonding section from the surface of the optical waveguide, the bonding section can be prevented from acting as a thin film.

In a step after formation of the groove on the photoresist, an RIE process (an oxygen plasma process) is preferably performed in order to remove organic residues of the photoresist developer which have been left on the surface of the waveguide in the groove forming step and also in order to remove a denatured surface layer of the waveguide. Such a process increases the bonding force of the prism onto the waveguide.

The adhesive is preferably a photo-curable material which is advantageous in that the time period required for fixing the prism is shorter and thus the reduction in coupling efficiency caused by, for example, the positional offset of the prism while the prism is being fixed is minimized.

EXAMPLE 1

FIG. 1 is a cross sectional view showing a structure of the photocoupler 100 according to the first example of the present invention.

The photocoupler 100 includes a substrate 3, a first dielectric layer 1 provided on the substrate 3, a second dielectric layer 2 provided on the first dielectric layer 1, and a prism (a light incidence component) 4 bonded onto the second dielectric layer 2 through a bonding section 5. Each of the layers has a prescribed thickness. The bonding section 5 has an edge surface 7 used for photocoupling. The substrate 3, the first dielectric layer 1 and the second dielectric layer 2 are included in a waveguide 6.

The first dielectric layer 1 has a tapered portion 8 where the thickness thereof varies. The specific shape of the tapered portion 8 will be described later.

Refractive index $n_1$ of the first dielectric layer, refractive index $n_2$ of the second dielectric layer, refractive index $n_s$ of the substrate 3, refractive index $n_p$ of the prism 4 and refractive index $n_b$ of the bonding section 5 should satisfy the relationship expressed by $n_1 > n_2$, $n_1 > n_s$, $n_b > n_1$. Moreover, the adhesive used for the bonding section 5 is preferably transparent.

In the photocoupler 100 shown in FIG. 1, the prism 4 is bonded to the waveguide 6. The prism 4 guides light incident thereon from the air to an area having a refractive index higher than that of the waveguide 6. The edge surface 7 of the bonding section 5 is actually involved in photocoupling.

Hereinafter, the principle of photocoupling will be described.

Light incident on the prism 4 and reaching the edge surface 7 or the vicinity thereof is incident on the interface between the bonding section 5 and the second dielectric layer 2 at such an angle that results in total reflection. However, the light is transmitted through the second dielectric layer 2 in a tunneling effect manner and then enters the first dielectric layer 1. The light is then totally reflected by the interface between the substrate 3 and the first dielectric layer 1 without entering the substrate 3 and is directed toward the top surface of the waveguide 6. However, the bonding section 5 is not existent on the second dielectric layer 2 on the optical path of the thus reflected light. Accordingly, the light is totally reflected at the top surface of the waveguide 6, and is directed toward the substrate 3. In this manner, the light is repeatedly totally reflected and propagates in the waveguide 6.

Materials usable for each element of the photocoupler 100 will be described.

The material used for the substrate 3 is appropriately selected in accordance with the use of the optical waveguide device including the photocoupler 100. A dielectric material such as a glass material can be used for the substrate 3. In addition, when the photocoupler 100 is included in the waveguide device integrated with a light receiving element, the substrate 3 preferably includes an Si layer and a dielectric layer provided on the Si layer. Usable dielectric materials include phosphorus-doped silicate glass (PSG), $SiO_2$ and spin-coatable glass (SOG).

The first dielectric layer 1 is preferably formed of SION or #7059 glass produced by Corning, Inc. although the preferable material depends on the material of the waveguide layer of the waveguide device including the photocoupler 100. In the first example, #7059 glass is used.

The second dielectric layer 2 is preferably formed of a material having a refractive index $n_2$ that is lower than a refractive index $n_1$ of the first dielectric layer 1. For example, when #7059 glass is used for the first dielectric layer 1, the second dielectric layer 2 is formed of $SiO_2$ or SOG which has a refractive index lower than that of #7059 glass.

Figure 3B:
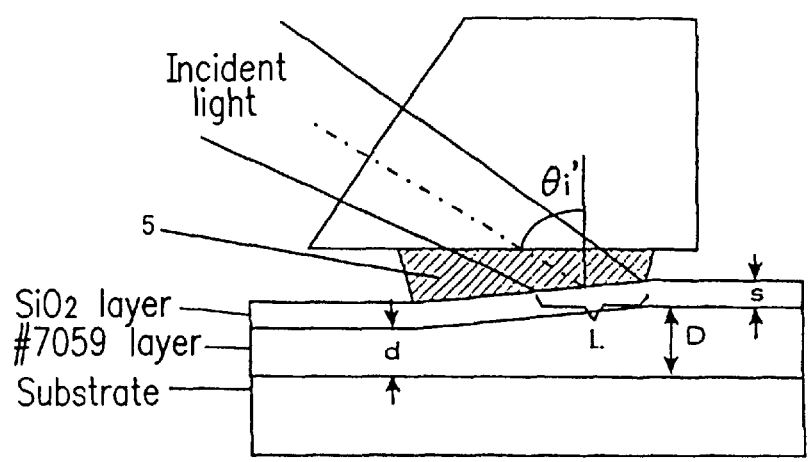
FIG. 3B is a cross-sectional view showing a photocoupler which was used to obtain the results shown in FIG. 3A.

FIGS. 2, 3A and 3b have already been discussed above, and thus the descriptions thereof are omitted.

EXAMPLE 2

FIG. 4 is a cross-sectional view showing a photocoupler 200 according to a second example of the present invention. The photocoupler 200 has a structure similar to that of the photocoupler 100 according to the first example of the present invention except that a substrate 13 includes an Si substrate 20 and a dielectric layer 21 formed from an $SiO_2$ layer having a refractive index $n_s$ of 1.44. In this case, a photodiode may be integrated on the Si substrate 20. According to the second example, a first dielectric layer 11 is formed of #7059 glass with a refractive index $n_1$ of 1.53 and a second dielectric layer 12 is formed of $SiO_2$ having a refractive index $n_2$ of 1.43 which is smaller than the refractive indices $n_1$, $n_p$ and $n_b$ of the first dielectric layer 11, a prism 14 and a bonding section 15. The substrate 13, the first dielectric layer 11 and the second dielectric layer 12 form an optical waveguide 16. Herein, the values of the refractive indices are all with respect to incident light having a wavelength of 780 nm.

Hereinafter, a manner for setting the refractive indices of the prism and the adhesive will be described taking the photocoupler 200 as an example.

Refractive index $n_p$ of the prism 14 is preferably larger than each of the refractive indices $n_1$, $n_2$ and $n_s$ of the first dielectric layer 11, the second dielectric layer 12 and the substrate 13, respectively. Preferably, the refractive index $n_p$ is equal to or close to the refractive index $n_b$ of the bonding section 15 in order to reduce light reflection by the interface between the prism 14 and the bonding section 15. For example, as shown in FIG. 4, where the incidence angle of light on the interface between the prism 14 and the bonding section 15 is $\theta_{bi}$, refractive index $n_b$ of the bonding section 15 needs to be set so as to fulfill the following two expressions (5) and (6) in order to keep the reflectance of the light by the interface between the prism 14 and the bonding section 15 at a prescribed value R or less:

$$[n_p \cos \theta_{bi} - (n_b^2 - n_p^2 \sin^2 \theta_{bi})^{1/2}]^2 / [n_p \cos \theta_{bi} + (n_b^2 - n_p^2 \sin^2 \theta_{bi})^{1/2}]^2 > R \quad \text{expression (5)}$$

$$[n_b \cos \theta_{bi} - (n_p/n_b)\cdot(n_b^2 - n_p^2 \sin^2 \theta_{bi})^{1/2}]^2 / [n_b \cos \theta_{bi} - (n_p/n_b)\cdot(n_b^2 - n_p^2 \sin^2 \theta_{bi})^{1/2}]^2 > R \quad \text{expression (6)}$$

For example, in the case where the prism 14 is formed of a material having a refractive index $n_p$ of about 1.57 (for example, glass material LF5 produced by K. K. Ohara Kogaku Garasu Seizosho), the reflectance of light by the interface between the prism 14 and the bonding section 15 becomes approximately zero by forming the bonding section 15 of an adhesive having a refractive index $n_b$ which is sufficiently close to a refractive index $n_p$ of the prism 14, i.e., about 1.57. For example, LX-2310C which is a UV-curable adhesive produced by Loctite Corporation or World Rock X8721 produced by Kyoritsu Chemical Industry Co., Ltd. can be used.

An edge surface 17 of the bonding section 15 is formed so as to make contact with the surface of the optical waveguide 16 in a straight line. By doing so, the edge surface 17 of the bonding section 15 can be accurately positioned with respect to the edge 19 of the tapered portion 18 of the first dielectric layer 11 of the optical waveguide 16. Thus, the distance between the edge surface 17 of the bonding section 15 and the edge 19 of the tapered portion 18 may be suitably set so as to obtain a maximum coupling efficiency.

Hereinafter, the shape of the tapered portion 18 will be described. As shown in FIG. 4, the tapered portion 18 of the photocoupler 200 according to the second example has a length t and a thickness that varying from d to D (where D>d) that forms a straight slope. The edge 19 of the tapered portion 18 and the edge surface 17 of the bonding section 15 do not necessarily have to be matched. According to the second example, the position of the edge 19 and the position of the edge surface 17 are matched for obtaining a maximum coupling efficiency.

As described above, in order to enlarge the allowable incident position area for light incident to the photocoupler 200 (which is represented by the distance between the edge surface 17 and the center of the incident light beam with respect to the coupling efficiency), the photocoupler preferably outputs light with a varied type radiation pattern shown in FIG. 23 rather than a monotonous decreasing type radiation pattern also shown in FIG. 23.

In order to obtain such a varied type radiation pattern, the radiation pattern of light with a wavelength λ output from the optical waveguide 16 of the photocoupler 200 needs to fulfill the above expression (1). Herein, $\alpha_m$ is a radiation coefficient at a section $(x_{n-1} < x < x_n)$ where the thickness of the first dielectric layer 11 varies in a tapering manner along x direction and $a_n$ is an amplitude at a position which is distance $x_n$ away from the edge surface 17. The "x direction" is the direction in which coupled light propagates.

Figure 5A:
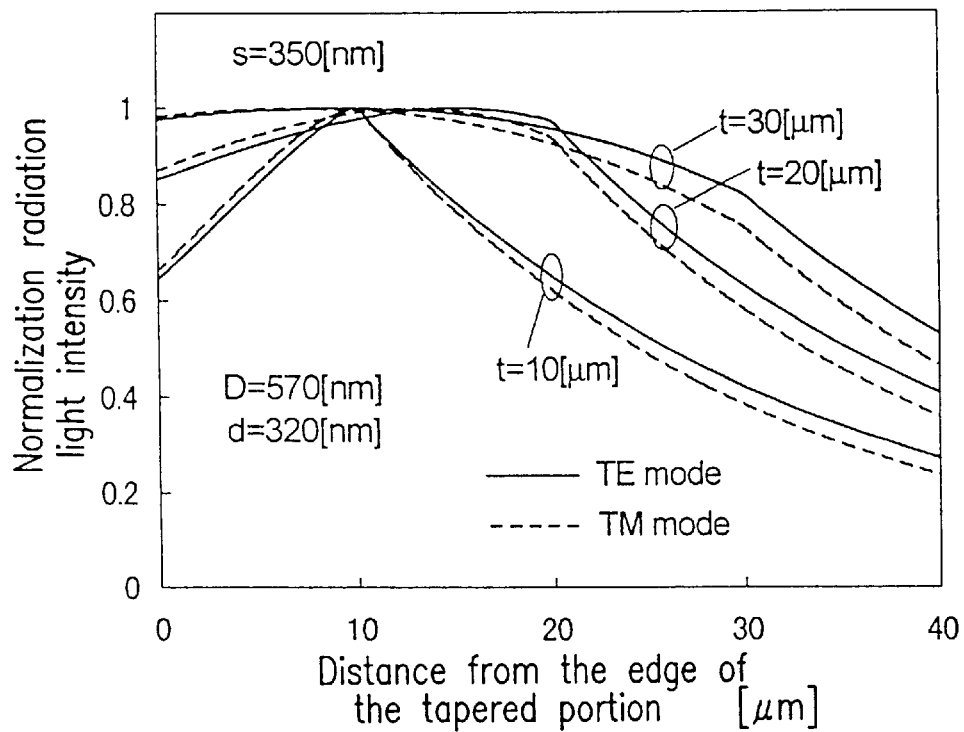
FIGS. 5A and 5B are graphs showing radiation characteristics of outgoing light from photocouplers as normalized radiation light intensity vs. distance from the edge of the tapered portion.

Accordingly, a radiation pattern is calculated by determining a radiation coefficient $\alpha_m$ by substituting each of the refractive indices or the thicknesses of the components forming the photocoupler 200 for the variables of expression (3), i.e., $n_b=1.57$, $n_a=1.0$, $n_2=1.43$, $n_1=1.53$, $n_s=1.44$, h (FIG. 9)=0, q=$d_n$. In the photocoupler 200 according to the second example, the thickness (indicated by a letter s) of the second dielectric layer ($SiO_2$ cladding layer) 12 is 350 nm. The tapered portion 18 of the #7059 glass waveguide layer 11 has a thickness that varies from d=320 nm to D=570 nm and the taper length t of 10 μm (hereinafter, the tapered portions of the second dielectric layer 12 and the waveguide layer 11 are simply referred to as a photocoupler structure 501). FIG. 5A is a graph showing respective radiation patterns obtained for the cases where the taper lengths t are 10 μm, 20 μm or 30 μm, each of which satisfies the relationship of expression (1).

Figure 6A:
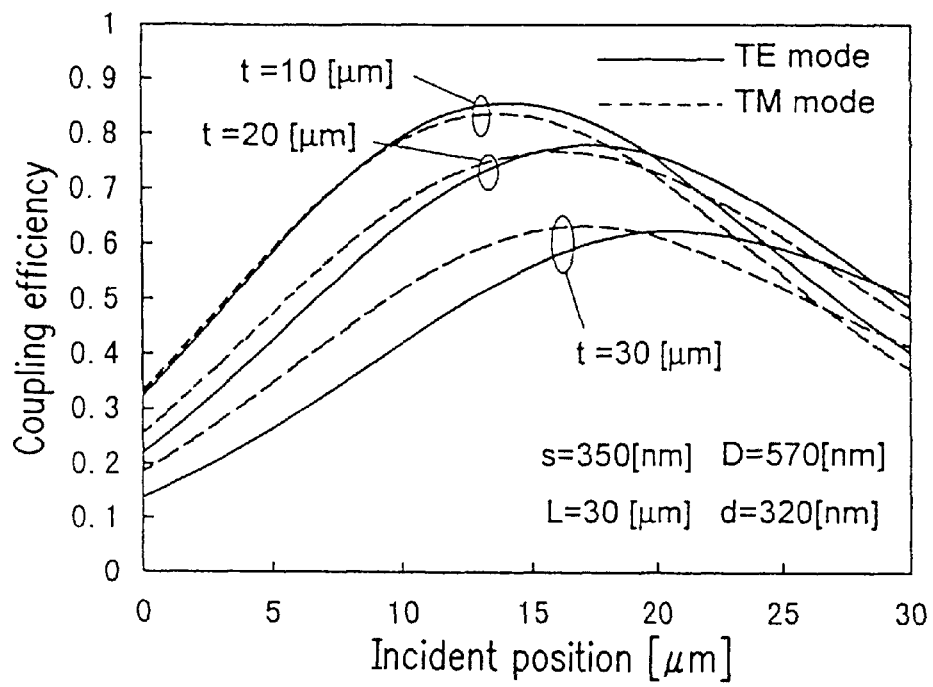
FIGS. 6A and 6B are graphs showing coupling efficiencies depending on incident positions.

Moreover, it should be noted that when the taper length t is longer, radiation characteristic is less likely to be influenced in accordance with the incident position. In other words, longer taper length t results in a radiation pattern with more gentle inclination. As shown in FIG. 6A, the changes in the coupling efficiency with respect to the incident position is most insignificant when the taper length is 30 μm. However, it is noted that such less relationship with respect to the incident position is associated with reduction in the maximum coupling efficiency. Thus, it is preferable to prevent such reduction in the maximum coupling efficiency.

For example, in the case of incident light having a beam spot diameter L of about 30 μm, in order to restrict reduction in the coupling efficiency, the allowable incident position area with respect to the coupling efficiency determined for the photocoupler structure 501 is increased while minimizing the reduction in the coupling efficiency.

Hereinafter, the results of comparison with the conventional example shown in FIGS. 24A and 24B will be described.

Figure 24A:
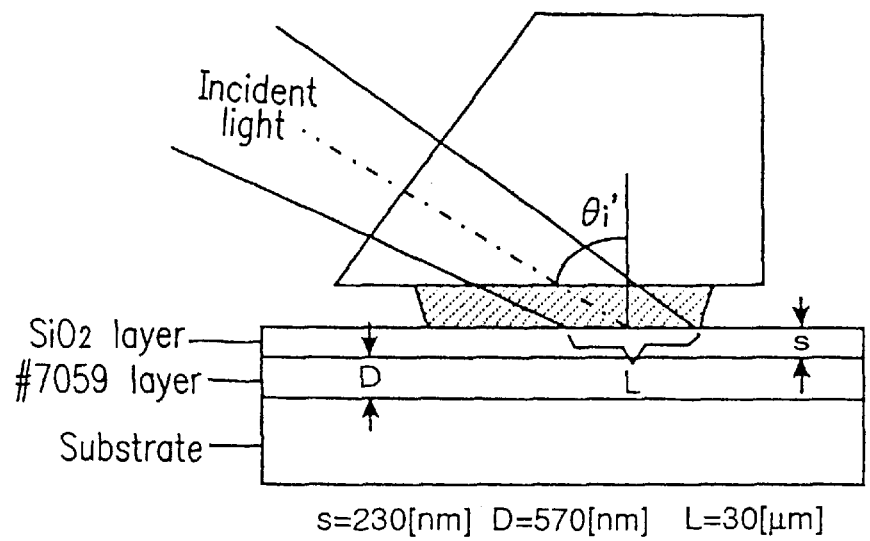
FIG. 24A is a cross-sectional view showing a conventional photocoupler.
Figure 24B:
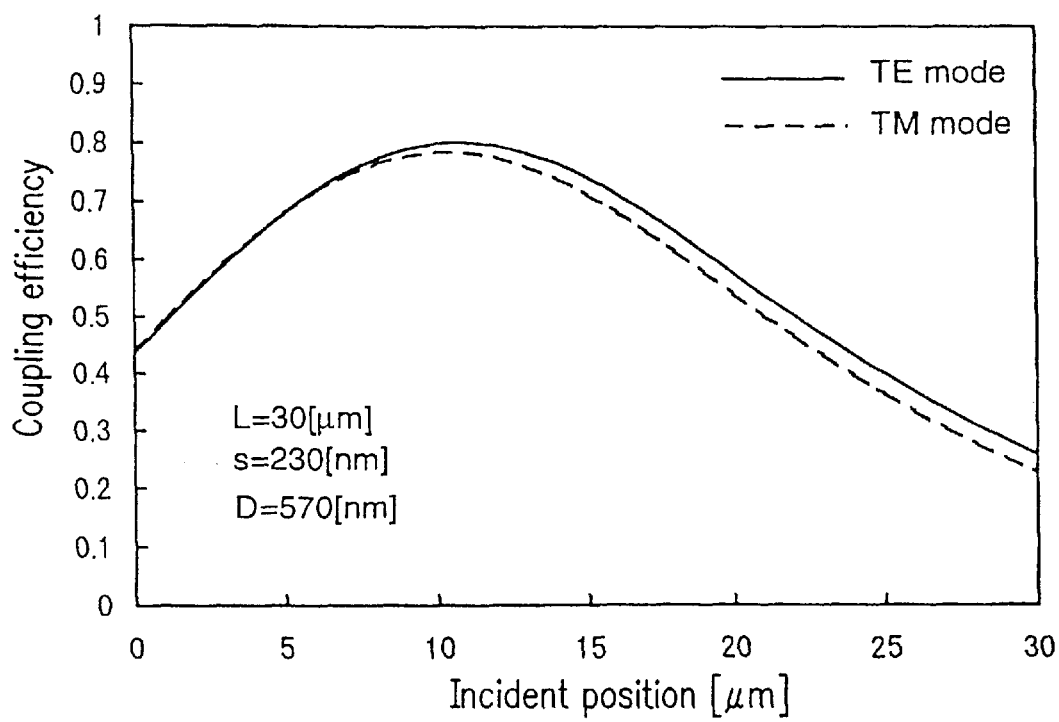
FIG. 24B is a graph showing coupling efficiency depending on incident positions of the conventional photocoupler shown in FIG. 24A.

Under the condition where an incident beam spot diameter L is 30 μm and the taper length t is 10 μm, the allowable incident position area (defined by a coupling efficiency of 60% or more) of the photocoupler structure 501 according to the second example of the present invention in which the allowable incident position area has been enlarged while suppressing reduction in the coupling efficiency, is compared with that (FIG. 24B) of the photocoupler shown in FIG. 24A in which the #7059 glass waveguide layer 11 is not tapered and which is optimized with respect to the coupling efficiency. As a result, the allowable incident position area of the former photocoupler structure 501 is ±9 μm with respect to the optimum incident position at which the maximum coupling efficient is obtained, whereas the allowable incident position area of the photocoupler shown in FIG. 24A is ±7.5 μm with respect to the optimum incident position.

Figure 5B:
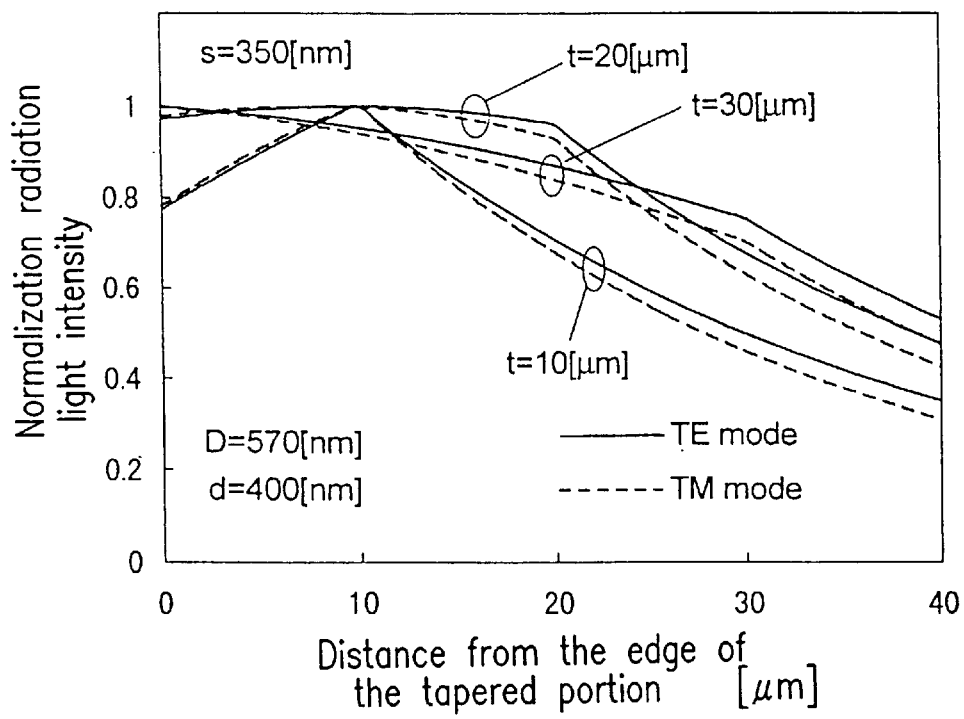
Figure 6B:
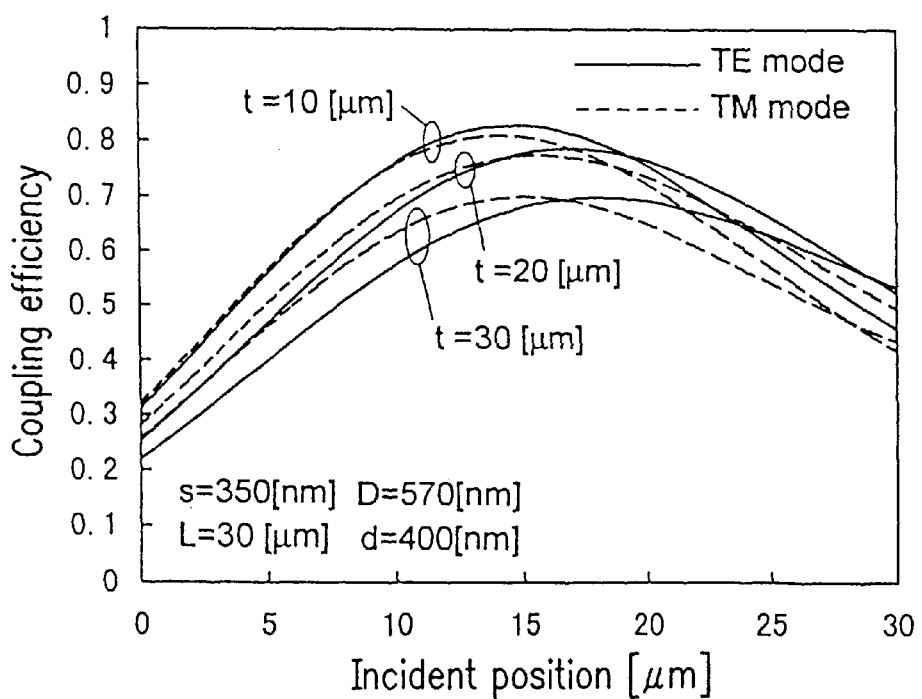

Moreover, in the case where a photocoupler 200 includes an SiO$_2$ cladding layer 12 having a thickness s of 350 nm, and a #7059 glass waveguide layer 11 having a thickness varying from d=400 nm to D=570 nm and taper lengths t of 10 μm, 20 μm and 30 μm, radiation patterns shown in FIG. 5B is obtained which is similar to that shown in FIG. 5A. Accordingly, in this case also as shown in FIG. 6B, an allowable incident position area with respect to the coupling efficiency is enlarged.

Under the condition where the taper length t of the #7059 glass waveguide layer 11 is 10 μm (hereinafter, tapered portions of the SiO$_2$ cladding layer 12 and the #7059 glass waveguide layer 11 having the taper length t of 10 μm are simply referred to as a photocoupler structure 502), the allowable incident position area with respect to the coupling efficiency is enlarged while minimizing the reduction in the coupling efficiency. Specifically, where the incident beam spot diameter L is set to 30 μm, the allowable incident position area of the photocoupler structure 502 is ±9 μm from the optimum incident position at which the maximum coupling efficient is obtained (FIG. 6B), whereas the allowable incident position area of the photocoupler shown in FIG. 24A is ±7.5 μm (FIG. 24B) from the optimum incident position.

Next, the shape of the prism 14 included in the above-described photocoupler 200 will be described.

In the case where a parallelopiped prism having trapezoid side surfaces is used as the prism 14 as shown in FIG. 4, the slanting face of the prism 14 becomes substantially perpendicular to the optimum incident direction of each of the TE polarized light and the TM polarized light by making the base angle φ of the prism 14 substantially equal to the angle θ$_{op}$ obtained by expression (7) shown below. Thus, the coupling efficiency with respect to TE polarized light and the coupling efficiency with respect to TM polarized light become substantially equal to each other and also as close as possible to the maximum possible efficiency value.

$$\theta_{op}=(\theta_{TE}+\theta_{TM})/2 \quad \text{expression (7)}$$

In expression (7), θ$_{TE}$ and θ$_{TM}$ represent incidence angles θ$_i$' onto the surface of the optical waveguide 16 at which the coupling efficiencies of respective TE polarized light and TM polarized light become maximum.

Figure 7:
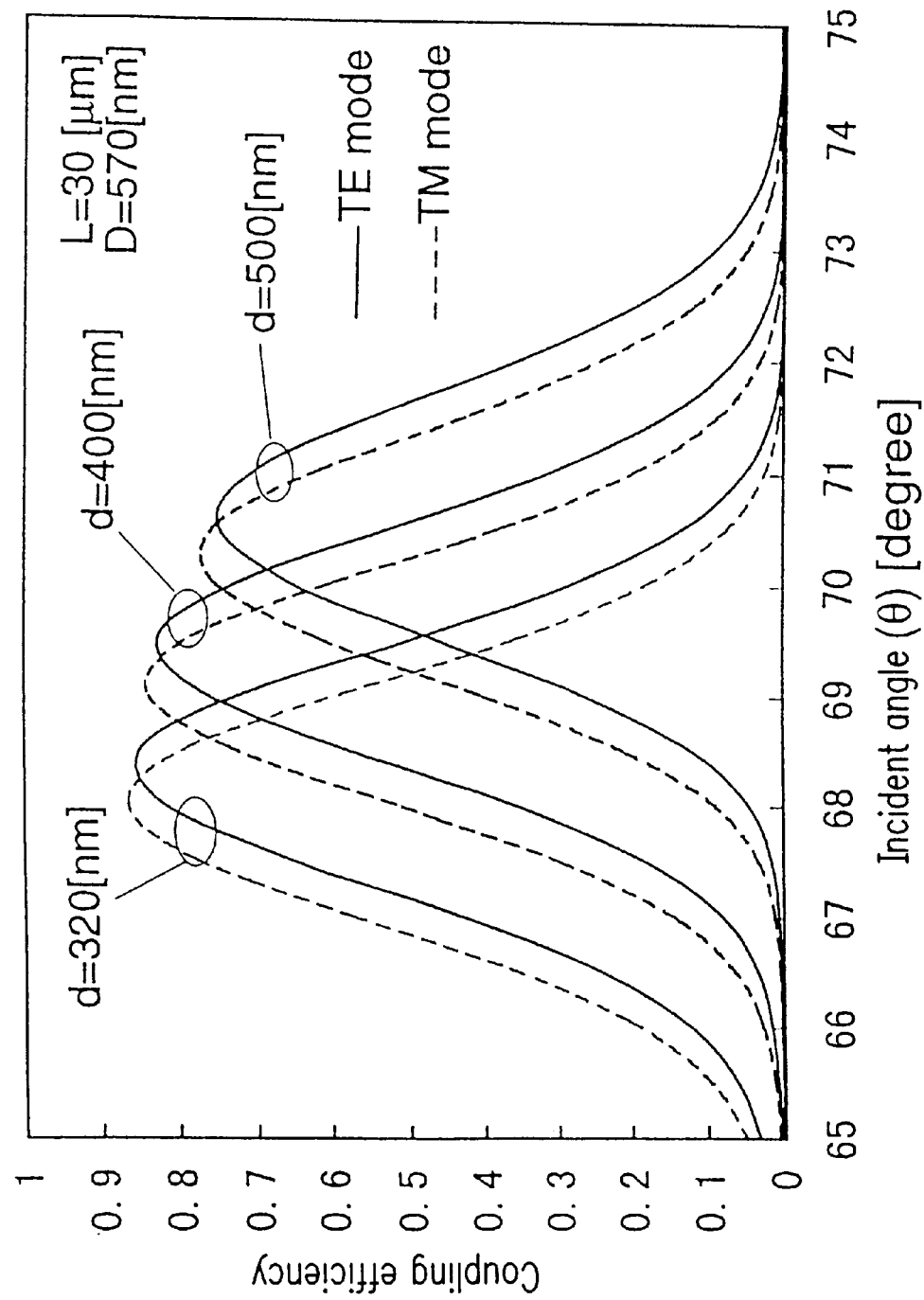
FIG. 7 is a graph showing incidence angle characteristics with respect to coupling efficiency.

Since θ$_{TE}$ and θ$_{TM}$ are determined in accordance with incidence angle characteristics with respect to the coupling efficiency (FIG. 7) which varies depending on the shape of the tapered structure, the base angle φ of the prism also changes in accordance with the changes in the tapered structure. In the case of the photocoupler structure 501, it is determined, with reference to FIG. 7, that θ$_{TE}$ is 68.4°, θ$_{TM}$ is 68.0° and the base angle φ of the prism is 68.2° (=θ$_{op}$).

Accordingly, for the photocoupler structure 501, the best coupling characteristic is obtained when the incidence angle θ$_i$ with respect to the photocoupler is 68.2°. On the other hand, for the photocoupler structure 502, with reference to FIG. 7, the best coupling characteristic are obtained when θ$_{TE}$ is 69.3°, θ$_{TM}$ is 68.9° and the base angle φ of the prism is 69.1°. Thus, for the photocoupler structure 502, the best coupling characteristic is obtained when the incidence angle θ$_i$ with respect to the photocoupler is 69.1°.

The shape of the prism can be determined such that the optical loss caused by reflection in the incident direction of light is minimum and can be changed in accordance with the shape of the tapered portion. In addition, other than the prisms 4 and 14 shown in FIG. 1 and 4, a prism 22 shown in FIG. 8 may also be employed which totally reflects incident light.

Figure 8:
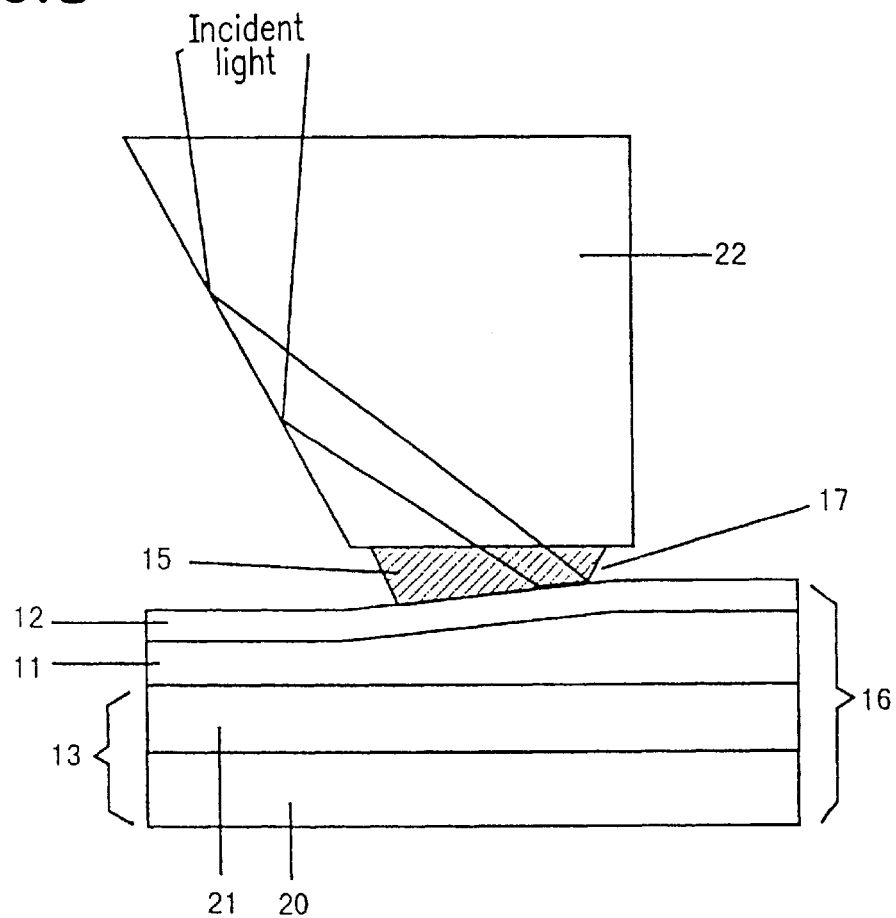
FIG. 8 is a cross-sectional view showing another example of photocoupler to which the present invention is applicable.

In FIG. 8, except for the prism 22, identical elements previously discussed with respect to FIG. 4 bear identical reference numerals therewith and the descriptions thereof are omitted.

Figure 9:
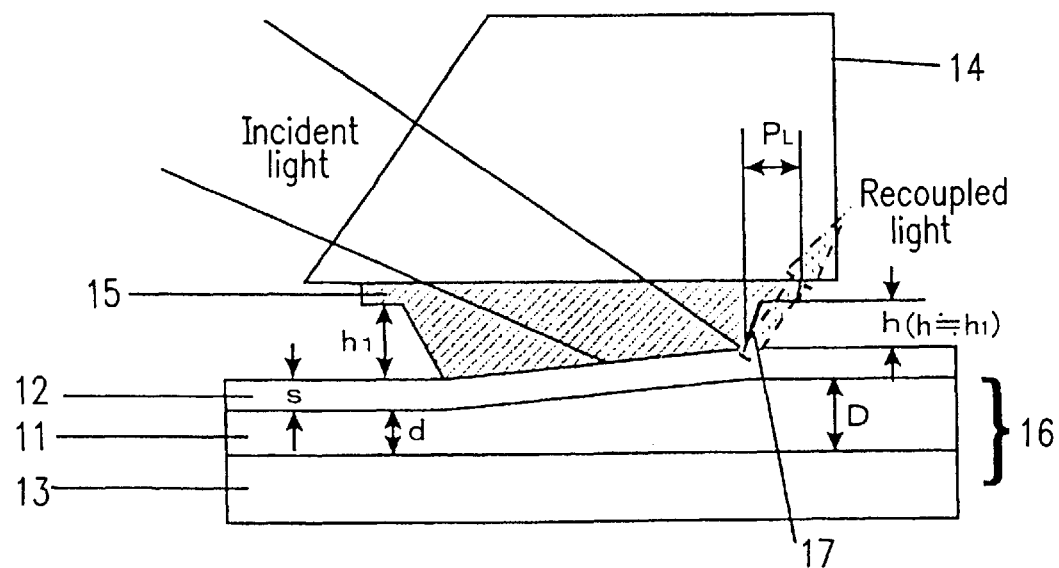
FIG. 9 is a cross-sectional view illustrating a manner of determining a height h of an edge surface of a bonding section.

Next, with reference to FIG. 9, setting the height h of the edge surface 17 from the surface of the optical waveguide 16 will be described. In the photocoupler 200 according to the second example of the present invention, in the case where a part of the prism 14 or a part of the bonding section 15 projects from the edge surface 17 of the bonding section 15 in a horizontal direction by length PL from the contact line between the edge surface 17 and the surface of the optical waveguide 16 (see FIGS. 1 and 9; in FIG. 9, the bonding section 15 is adhered on the surface of the prism 14 facing the optical waveguide), sufficient height h from the surface of the optical waveguide 16 is required. Otherwise, light propagated through the optical waveguide 16 is transmitted toward (recoupled with) a high refractive index area (i.e., an area having a refractive index higher than those of the second dielectric layer 12 and the first dielectric layer 11) such as the bonding section 15 or the prism 14, etc. in a manner shown in FIG. 9 represented by a dashed-line arrow, thereby reducing the coupling efficiency.

Therefore, preferably, in order to eliminate the effect of the recoupling, the height h of the edge surface 17 from the surface of the optical waveguide 16 should satisfy the following expression (8):

$$1-\exp(k_o\alpha_{rD}P_L)=1 \quad \text{expression (8)}$$

where P$_L$ is a length of the projecting portion of the prism 14 or a portion of the bonding section 15, and α$_{rD}$ (a function of the height h of the edge surface) is one of imaginary parts (a radiation coefficient), which has a greater absolute value than that of the other, of the complex solutions β$_{TE}$ and β$_{TM}$ of the equation (3) with respect to a TE polarized light and a TM polarized light at the maximum thickness D of the first dielectric layer 11.

By satisfying the above-described expression (8), the edge surface 17 is ensured to have a sufficient height for preventing the reduction in the coupling efficiency caused by recoupling. Even in the case where the prism 14 and the bonding section 15 do not project from the edge surface 17, determining the height of the edge surface 17 still requires some consideration since the refractive index of the adhesive 15 may be affected under various conditions including ambient temperature and may act as a thin film between the prism 14 and the optical waveguide 16. Herein, to avoid the bonding section 15 acting as a thin film means that the height h of the edge surface 17 is determined so as to reduce multiple reflection. It is considered that the bonding section 15 is completely prevented from acting as a thin film between the prism 14 and the optical waveguide 16 by eliminating the multiple reflection in an Airy disk (radius: r$_A$) of the incident beam spot. Thus, preferably, the height h of the edge surface is set so as to satisfy the following expression (2):

$$h>2r_A/\sin\theta_i' \quad \text{expression (2)}$$

For example, in the case of the photocoupler structure 501 (FIG. 4) according to the present invention, with an incident beam spot diameter L of 30 μm, a numerical aperture (NA) of a collective lens is about 0.057. Accordingly, r$_A$ is 8.4 μm as derived from an equation r$_A$=0.61 λ (=780 nm)/NA. Since the incidence angle θi' is determined as 68.2° (=θ$_{op}$) from FIG. 7 as described above, the height h of the edge surface 17 of the bonding section 15 is 18 μm or more from the above expression (2).

Hereinafter, a method for producing the photocoupler 200 in which a photoresist with a groove is used for forming the edge surface 17 will be described, taking the case of the photocoupler structure 501 as an example. FIG. 10A through 10G are cross-sectional views illustrating the steps included in the method.

Figure 10A:
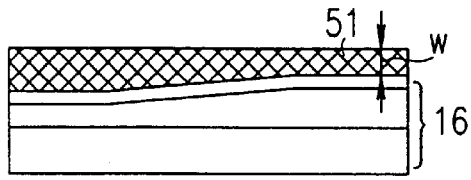
FIGS. 10A through 10G are views showing the steps for producing the photocoupler according to the second example of the present invention.

As shown in FIG. 10A, a photoresist 51 is applied on the optical waveguide 16. The thickness W of the photoresist 51 corresponds to height h of the edge surface 17. It should be noted that, since the refractive index of the adhesive varies in accordance with various conditions including ambient temperature, the thickness W of the photoresist 51 is determined so as to satisfy the above-described expression (2) and be sufficiently greater than about 18 μm (to satisfy the relationship W>h) so as to avoid the bonding section 15 from acting as a thin film.

In FIG. 10A, the surface of the photoresist 51 does not follow along the surface of the tapered portion 18 of the optical waveguide 16 but is generally parallel with the surface of the substrate 13. This is caused since the slope of the tapered portion 18 is not so steep with respect to the thickness of the photoresist 51.

Figure 10B:
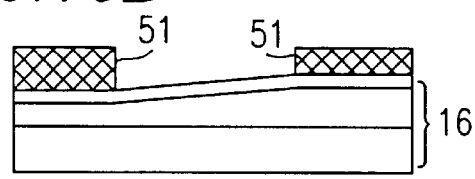
Figure 10C:
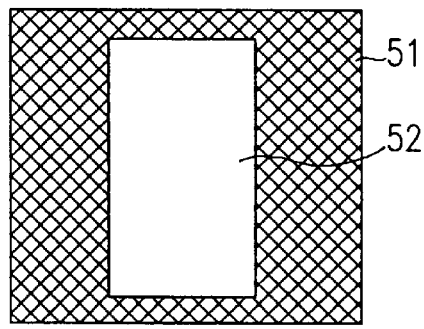

Next, as shown in FIG. 10B and 10C, the photoresist 51 is patterned to form a groove 52 into which the adhesive is injected.

In a step after formation of the groove 52, an RIE process (an oxygen plasma process) is preferably performed in order to remove organic residues of the photoresist developer which have been left on the surface of the optical waveguide 16 in the groove forming step and also in order to remove a denatured surface layer of the optical waveguide 16.

Figure 10D:
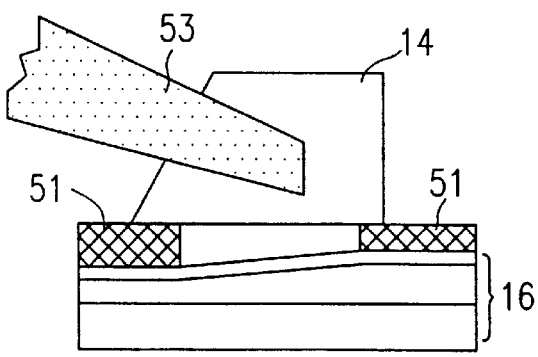
Figure 10E:
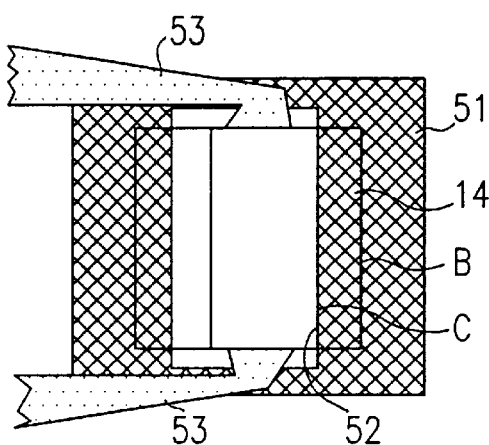

Then, as shown in FIGS. 10D and 10E, the prism 4 is put on the photoresist 51 having the groove 52. The position of the prism 14 is adjusted by a position adjuster 53 so that edges B of the prism 14 are parallel to edges C of the groove 52. Then, the prism 14 which is held at the adjusted position by the position adjuster 53 is pressed onto the photoresist 51. The prism 14 is preferably put on the photoresist 51 over the groove 52 as shown in FIG. 10D. By so setting, the prism 14 is bonded to photoresist 51 at two positions, whereby the bottom surface of the prism 14 is placed in a more parallel relationship with the surface of the waveguide 16. The base angle φ of the prism 14 (which is determined to minimize the reflectance of the light which is incident at such an optimum incidence angle that maximizes the coupling efficiency) is prevented from being offset with respect to the angle between the surface of the waveguide 16 and the incidence angle. Thus, the reduction in the coupling efficiency which is caused by the offset of the incidence angle with respect to the optimum incidence angle is minimized.

Figure 10F:
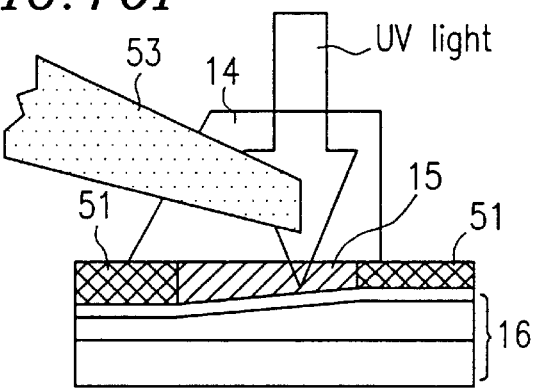

Then, as shown in FIG. 10F, an adhesive 15 is injected into the groove 52. The adhesive 15 is preferably a photo-curable material, for example, a UV-curable material. The adhesive 15 is cured by irradiation with UV light or the like, thus fixing the prism 14. The adhesive 15 may be other types of materials than the photo-curable material, but a photo-curable material is advantageous in that the time period required for fixing the prism 14 is shorter and thus the reduction in coupling efficiency caused by, for example, the positional offset of the prism 14 while the prism 14 is being fixed is minimized.

The adhesive 15 and the photoresist 51 need to be mutually chemically stable when the two are in contact with each other (i.e., should not react with each other). For example, when LX-2310C produced by Loctite Corporation is used for the adhesive 15, a positive photoresist, for example, PMER produced by Tokyo Ohka Kabushiki Kaisha is preferably used for the photoresist 51.

Figure 10G:
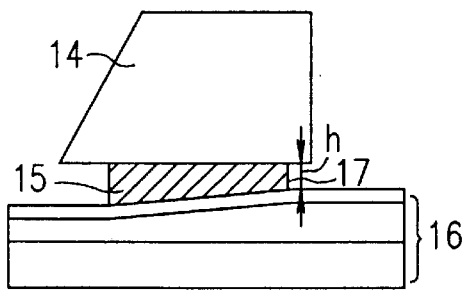

As shown in FIG. 10G, after the prism 14 is fixed, the photoresist 51 is removed.

The removal of the photoresist 51 in an area sandwiched between the prism 14 and the waveguide 16 proceeds faster as the gap between the prism 14 and the waveguide 16 is larger. Therefore, in order to facilitate the removal of the photoresist 15 in such an area, the photoresist 51 is preferably applied sufficiently thick. For example, according to the present example, a sufficiently viscous material is applied to a sufficient thickness as the photoresist 51. Specifically, the above-mentioned PMER is applied and baked, and then PMER is again applied such that the resultant thickness W of the photoresist 51 becomes 30 μm. Accordingly, the height h of the edge surface 17 of the bonding section 15 is about 30 μm.

By following the above-described steps, the edge surface 17 of the bonding section 15, corresponding to the edge B of the prism 14, is formed reflecting the shape of the groove 52 of the photoresist 51.

According to the method of the second example of the present invention, straightness of the line where the edge surface 17 of the bonding section 15 makes contact with the surface of the optical waveguide 16 is ensured to be as precise as the straightness of the patterned photoresist 51. At the same time, the edge surface 17 of the bonding section 15 and the edge 19 of the tapered portion 18 of the first dielectric layer (the #7059 glass waveguide layer) 11 (FIG. 4) can be aligned more accurately.

Figure 11:
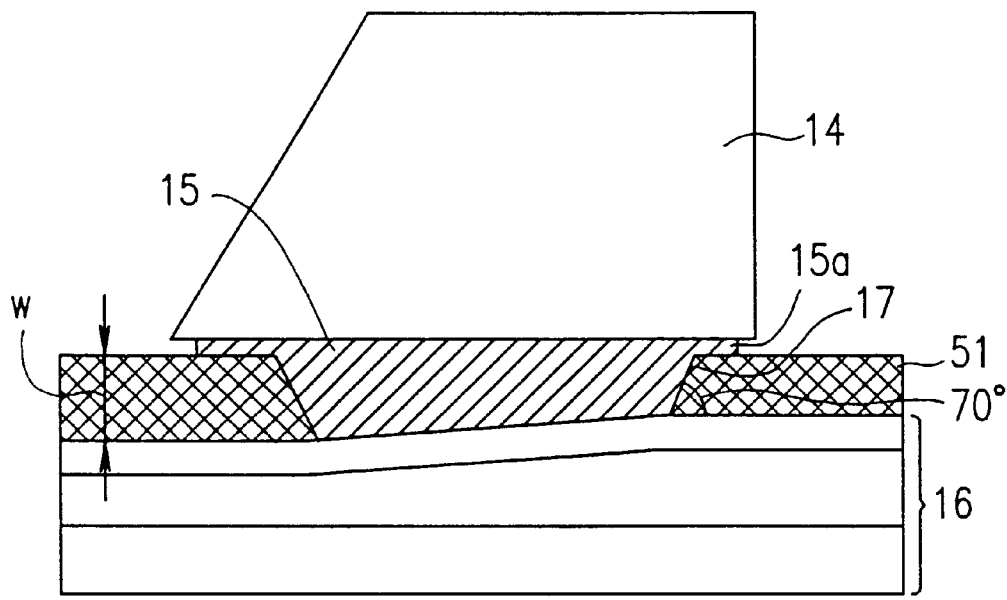
FIG. 11 is a cross-sectional view showing another example of photocoupler to which the present invention is applicable.
Figure 11:
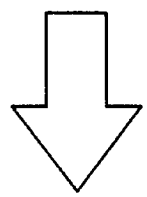
Figure 11:
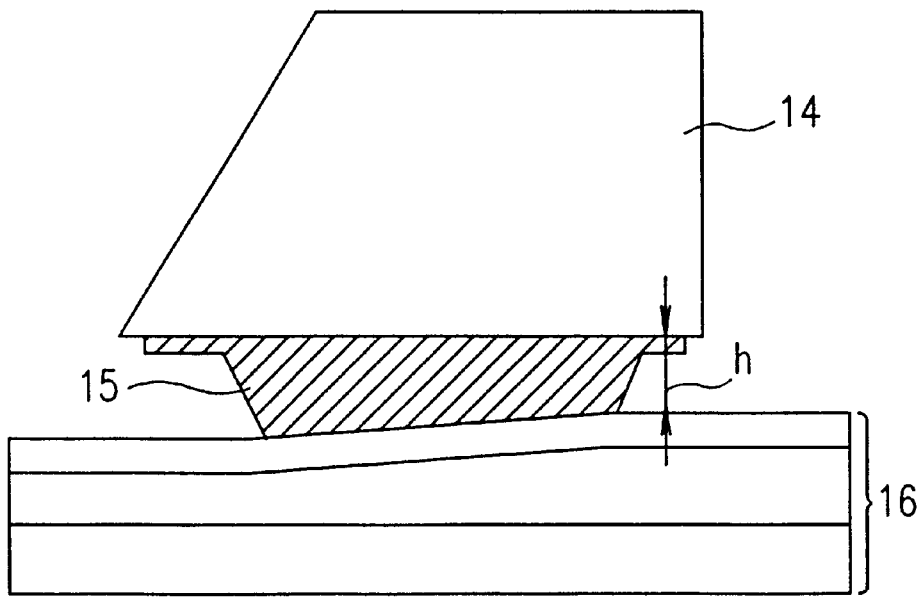

In FIG. 10G, the edge surface 17 is perpendicular to the surface of the waveguide 16 (i.e., the edge surface 17 makes contact with the surface of the waveguide 16 at 90 degrees); however, the contact angle is not limited to 90 degrees. For example, as shown in FIG. 11, when the edge surface of the photoresist 51 is formed on the waveguide 16 at an angle of 70 degrees, the edge surface 17 also makes contact with the waveguide 16 at an angle of 70 degrees.

Even if the edge surface 17 is inclined with respect to the surface of the waveguide 16, the coupling efficiency is not reduced since the propagation length in an area corresponding to the inclined edge surface 17 is short. Moreover, during the production, since it is difficult to cause the prism 14 to adhere to the photoresist 51 completely, the adhesive 15 may enter a space 15a between the photoresist 51 and the prism 14 and remain on the bottom surface of the prism 14 as shown in FIG. 11. Even in such a case, since sufficient distance between the surface of the waveguide 16 and the remaining adhesive 15a is provided by a space formed by removal of the resist 51 which formed the edge surface 17 of the adhesive 15, the coupling efficiency is not reduced.

EXAMPLE 3

Figure 12:
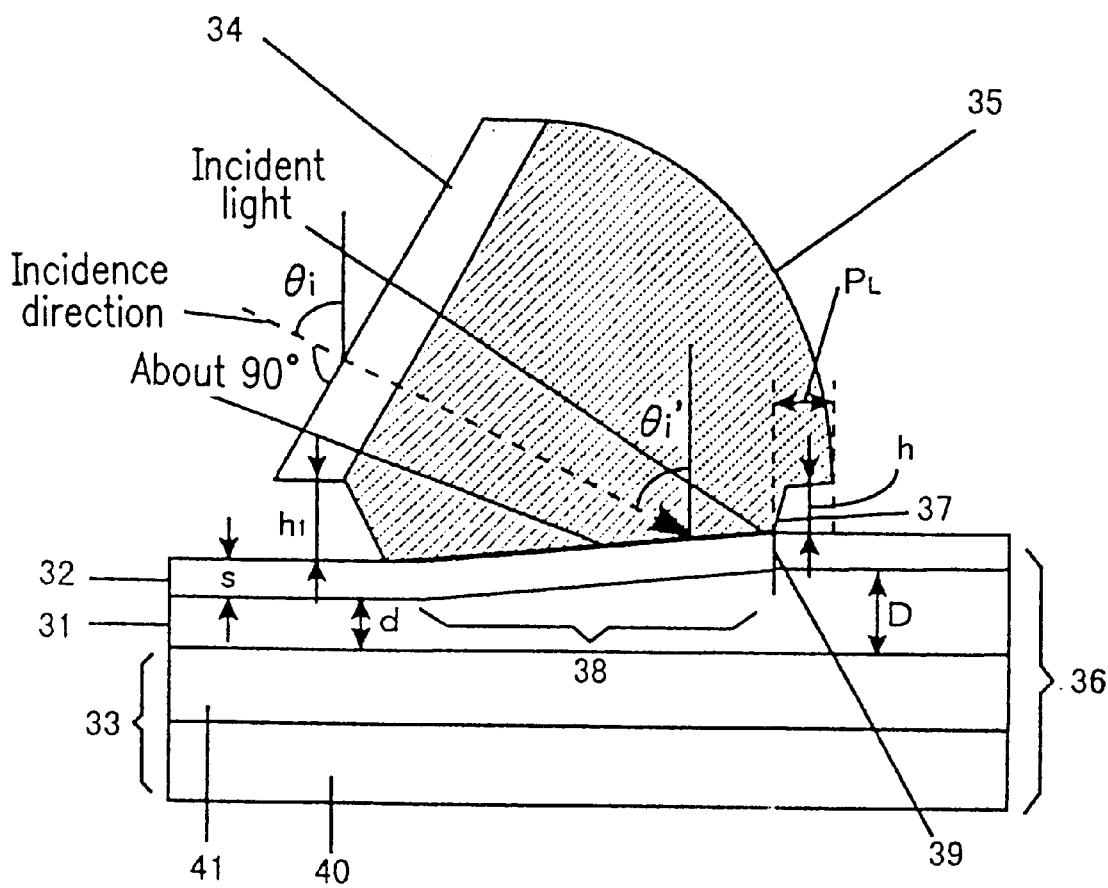
FIG. 12 is a cross-sectional view showing a photocoupler according to a third example of the present invention.

FIG. 12 is a cross-sectional view showing a photocoupler 300 according to a third example of the present invention. The photocoupler 300 uses a dielectric plate 34 as a light incidence component, instead of a prism. Since the dielectric plate 34 is easier to form than to form a prism, the photocoupler 300 shown in FIG. 12 is produced at lower cost than a photocoupler incorporating a prism.

The operation principle of the photocoupler 300 is the same as that of the photocoupler 200 described in the second example of the present invention. Specifically, light incident on the dielectric plate 34 transmits through a bonding section 35 and is directed toward a waveguide 36 via an edge surface 37. Thus, the photocoupler 300 incorporating the dielectric plate 34 has functions equivalent to those of the photocoupler 200 shown in FIG. 4, providing that the edge surface 37 of the bonding section 35 has a preferable height h from the surface of the optical waveguide 36. According to the photocoupler 300, too, in order to enlarge the allowable incidence position area with respect to the coupling efficiency, a tapered structure is determined such that a radiation pattern of light obtained therefrom satisfies the previous expression (1).

Specifically, the photocoupler 300 includes a substrate 33, a first dielectric layer 31 provided on the substrate 33, a second dielectric layer 32 provided on the first dielectric layer 31, and the bonding section 35 having the edge surface 37 used for photocoupling. The substrate 33, the first dielectric layer 31 and the second dielectric layer 32 are included in the waveguide 36. Specifically, the substrate 33 is formed of an Si substrate 40 and an $SiO_2$ film 41 (refractive index $n_s$=1.44) formed thereon; the first dielectric layer 31 is formed of #7059 glass (refractive index $n_1$=1.53); the second dielectric layer 32 is formed of $SiO_2$ (refractive index $n_2$=1.43); and the bonding section 35 is formed of adhesive having a refractive index $n_b$ of 1.57. The dielectric plate 34 is bonded on the bonding section 35. The difference between the refractive index of the bonding section 35 and that of the dielectric plate 34 is preferably as small as possible. For example, in order to reduce the reflectance by the interface between the bonding section 35 and the dielectric plate 34 to prescribed value R or less, refractive index $n_b$ of the bonding section 35 and refractive index $n_p$ of the dielectric plate 34 are set so as to fulfill the following expression (9) based on the fact that the light is incident on the dielectric plate 34 substantially perpendicularly.

$$(n_b-n_p)^2/(n_b+n_p)^2 < R \qquad \text{expression (9)}$$

For example, when UV photo-curable adhesive (LX-2310C produced by Loctite Corporation) is used for the bonding section 35, the dielectric plate 34 is preferably formed of a material having a refractive index $n_p$ of about 1.57 in order to make reflectance R zero, because the refractive index $n_b$ of the bonding section 35 is 1.57.

Radiation patterns shown in FIG. 5A and allowable incident position characteristics shown in FIG. 6A are also obtained for the photocoupler 300 employing the dielectric plate 34 under the conditions where: the dielectric plate 34 has a refractive index $n_p$=1.57; the second dielectric layer ($SiO_2$ cladding layer) 32 has a thickness s of 350 nm; and a tapered portion 38 of the first dielectric layer (#7059 glass waveguide layer) 31 has a thickness that varies from d=320 nm to D=570 nm and a taper length t of 10 $\mu$m, 20 $\mu$m or 30 $\mu$m.

Under the condition where an incident beam spot diameter L is 30 $\mu$m and the taper length t is 10 $\mu$m, the allowable incident position area (defined by a coupling efficiency of 60% or more) of the photocoupler 300 according to the third example of the present invention, in which incident position area has been enlarged while suppressing reduction in the coupling efficiency, is compared with that (FIG. 24B) of a photocoupler in which the #7059 glass waveguide layer 31 is not tapered and which is optimized with respect to the coupling efficiency. As a result, the allowable incident position area of the former photocoupler 300 is ±9 $\mu$m with respect to the optimum incident position at which the maximum coupling efficient is obtained, whereas the allowable incident position area of the latter photocoupler is ±7.5 $\mu$m with respect to the optimum incident position.

As shown in FIG. 12, the position of the dielectric plate 34 is adjusted so that the surface thereof is perpendicular to the incident direction, which is defined by an optimum incidence angle $\theta_{op}$ (defined by the above expression (7)) to the photocoupler 300. In other words, the position of the dielectric plate 34 is adjusted so that the angle between the dielectric plate 34 and the top surface of the waveguide 36 is substantially equal to the optimum incidence angle $\theta_{op}$. After the adjustment, the dielectric plate 34 is fixed on the optical waveguide 36 with an adhesive.

The edge 37 of the bonding section 35 is formed as follows. The photocoupler 300 according to the third example also uses the edge surface 37 for photocoupling. Accordingly, similar to the photocoupler structure 502 of second example, when the bonding section 35 is formed of an adhesive having a refractive index $n_b$ of 1.57, the photocoupler 300 also has incidence angle characteristics with respect to the coupling efficiency illustrated in FIG. 7 and has the best coupling characteristic when the optimum incidence angle $\theta_i'$ with respect to the photocoupler is 68.2°. Thus, the base angle $\phi$ of the dielectric plate 34 is made equal to $\theta_{op}$, i.e., 68.2° and the best coupling efficiency of the photocoupler 300 is obtained by setting the incidence angle $\theta_i$ to 68.2°. In addition to such setting, the reflectance of light by the incidence surface of the dielectric plate 34 is preferably reduced by providing thereon a non-reflection coating.

Another example of the photocoupler 300 will be described. In the case where the photocoupler 300 includes an dielectric plate 34 having a refractive index $n_p$ of 1.57, a bonding section 35 having a refractive index $n_b$ of 1.57, a second dielectric layer (an $SiO_2$ cladding layer) 32 having a thickness s of 350 nm, and a first dielectric layer (#7059 glass waveguide layer) 31 having a thickness varying from d=400 nm to D=570 nm and taper lengths t of 10 $\mu$m, 20 $\mu$m and 30 $\mu$m), allowable incident position areas with respect to the coupling efficiency is enlarged as the photocoupler structure 502 according to the second example. Furthermore, by setting the base angle $\phi$ of the dielectric plate 34 to 69.1°, the best coupling efficiency is obtained by setting the incidence angle $\theta_i$ to 69.1°.

Also according to the third example of the resent invention, The height h of the edge surface 37 of the bonding section 35 from the surface of the optical waveguide 36 is also set so as to fulfill above expression (8) in the same manner as in the second example of the present invention.

With reference to FIGS. 13A through 13G, a method for producing the photocoupler 300 according to the third example of the present invention will be described including a step of forming the edge surface 37.

Figure 13A:
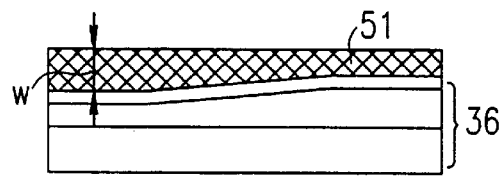
FIGS. 13A through 13G are views showing the steps for producing the photocoupler according to the third example of the present invention.

First, the waveguide 36 is formed by providing, on the substrate 33, the first dielectric layer 31 and the second dielectric layer 32 sequentially. A photoresist 51 is then applied on the waveguide 36 as shown in FIG. 13A. The thickness W of the photoresist 51 is set in the same manner as in the second example so as to prevent recoupling with part of the bonding section 35 projecting for a length $P_L$ from the edge surface 37. Since the height h of the edge surface 37 which is defined by the photoresist 51 is determined so as to satisfy expression (8), the thickness W of the photoresist 51 is set so as to satisfy the relationship W>h.

Figure 13B:
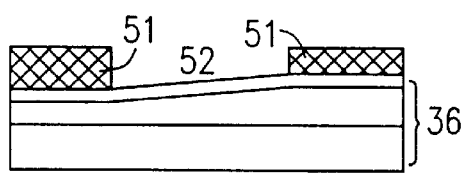
Figure 13C:
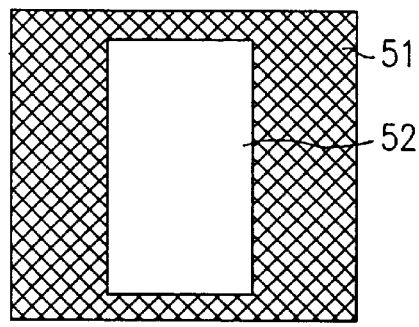

Next, as shown in FIGS. 13B and 13C, the photoresist 51 is patterned to form a groove 52 into which the adhesive is injected. In a step after the formation of the groove 52, an RIE process (an oxygen plasma process) is preferably performed in order to remove organic residues of the photoresist developer which have been left on the surface of the waveguide 36 in the groove formation step and also in order to remove a denatured surface layer of the waveguide 36.

Figure 13D:
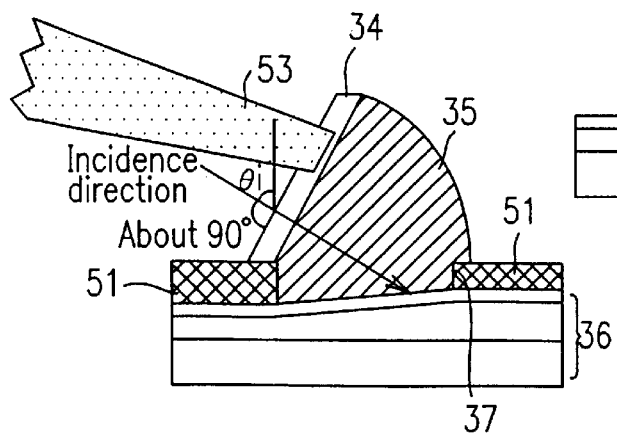
Figure 13E:
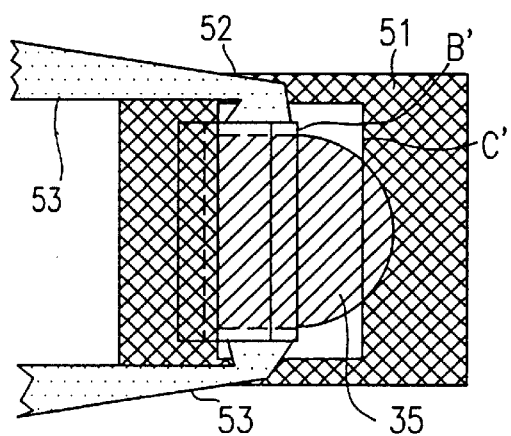

Then, as shown in FIGS. 13D and 13E, the dielectric plate 34 is put on the photoresist layer 51 after the position thereof is adjusted by a position adjuster 53. The position of the dielectric plate 34 is adjusted so that edges B' of the dielectric plate 34 are parallel to edges C' of the groove 52 and that the incident surface is perpendicular to the desired incident angle with respect to the surface of the waveguide 36 (at a base angle φ).

Figure 13F:
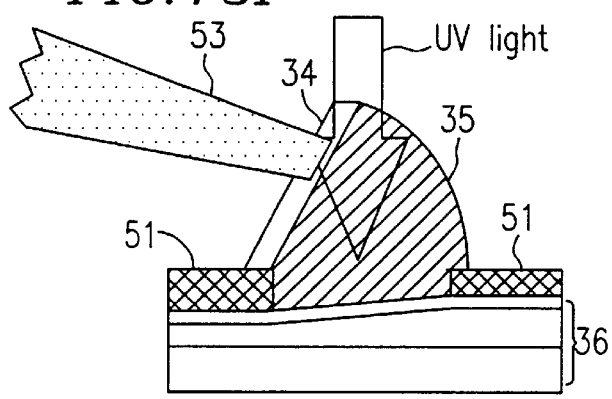

In such a state shown in FIGS. 13D and 13E, an adhesive 35 is injected into and covers the groove 52. The adhesive 35 is preferably a photo-curable material, for example, a UV-curable material. Subsequently, as shown in FIG. 13F, the adhesive 35 is cured by irradiation with UV light or the like, thus fixing the dielectric plate 34. The adhesive 35 may be other types of materials than the photo-curable material, but a photocurable material is advantageous in that the time period required for fixing the dielectric plate 34 is shorter and thus the reduction in coupling efficiency caused by, for example, the positional offset of the dielectric plate 34 while the dielectric plate 34 is being fixed is minimized.

Figure 13G:
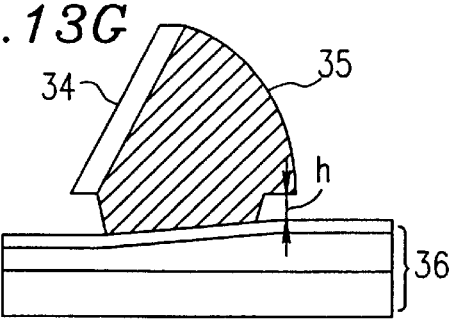

As shown in FIG. 13G, after the dielectric plate 34 is fixed, the photoresist 51 is removed.

The removal of the photoresist 51 in an area sandwiched between the dielectric plate 34 and the waveguide 36 proceeds faster as the gap between the dielectric plate 34 and the waveguide 36 is larger. In order to facilitate the removal of the photoresist 51 in such an area, the photoresist 51 is preferably applied sufficiently thick. For example, a sufficiently viscous material is applied in a sufficient thickness as the photoresist 51.

Specifically, in the same manner as in the second example of the present invention, PMER is applied to a thickness of about 15 μm and baked, and then PMER is again applied to a thickness of about 15 μm, so that the total thickness W of the photoresist 51 is 30 μm. Thus, height h of the edge surface 37 of the bonding section 35 becomes about 30 μm.

In FIG. 13A, the surface of the photoresist 51 does not follow along the surface of the tapered portion 38 of the optical waveguide 36 but is generally parallel with the surface of the substrate 33. This is caused because the slope of the tapered portion 38 is not so steep with respect to the thickness of the photoresist 51.

Hereinafter, ideal structural conditions for each of the photocouplers 100, 200 and 300 according to the present invention will be described.

As described above, when the beam spot diameter of the incident light beam is about 30 μm, an allowable incident position area is most enlarged when the photocoupler outputs light having the radiation pattern with the taper length t of 10 μm shown in FIG. 5A. Thus, in order to obtain a higher coupling efficiency, structural conditions of a photocoupler are determined so as to have a radiation pattern closer to the radiation pattern shown in FIG. 5A with the taper length t of 10 μm.

FIGS. 14A, 14B, 15A, 15B, 16A, 16B and 17A are graphs showing radiation patterns of light output from photocouplers having the taper length t of 10 μm. In respective graphs, the refractive index $n_b$ of the adhesive, the refractive indices $n_c$ of the second dielectric layer (the cladding layer), the refractive index $n_g$ of the waveguide layer, the refractive index $n_s$ of the substrate, the thickness s of the second dielectric layer, the maximum thickness D of the waveguide layer or the minimum thickness d of the waveguide layer is varied. In each graph, the dashed line represents a photocoupler with the following conditions: $n_b$=1.57, $n_c$=1.43, $n_g$=1.53, $n_s$=1.45, s=350 nm, D=570 nm and d=360 nm.

Figure 14A:
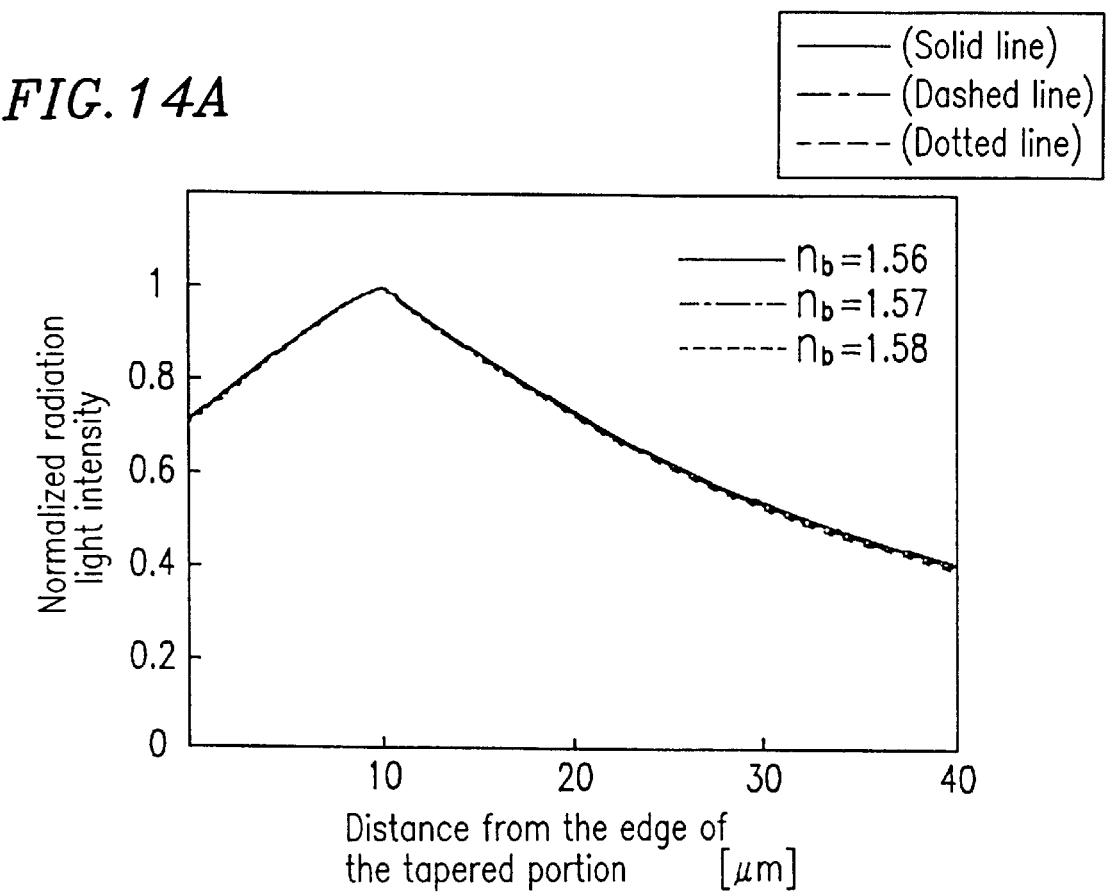
FIG. 14A is a graph showing radiation patterns of output light from photocouplers each having an adhesive of a different refractive index.

FIG. 14A is a graph showing radiation patterns of light output from photocouplers each having an adhesive of a different refractive index $n_b$ (i.e., 1.56, 1.57 and 1.58). As can be seen from the graph, difference among the radiation patterns is substantially insignificant. However, the curves of the radiation patterns are gentler as the refractive indices $n_b$ of the adhesive are smaller (i.e., 1.58→1.56).

Figure 14B:
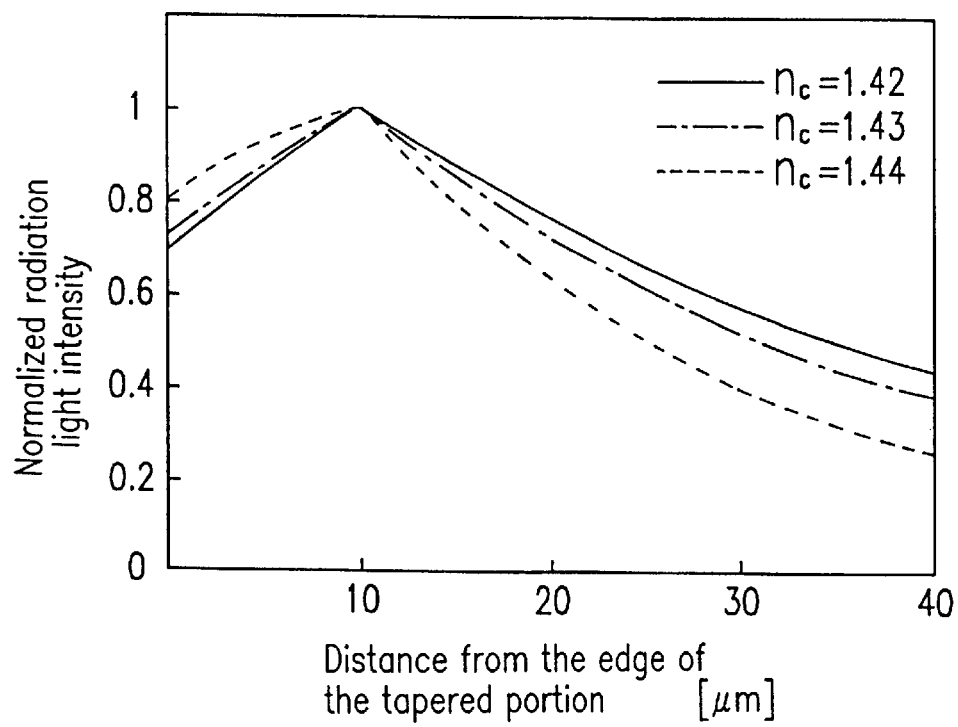
FIG. 14B is a graph showing radiation patterns of outgoing light from photocouplers each having a second dielectric layer of a different refractive index.

FIG. 14B is a graph showing radiation patterns of light output from photocouplers each having a second dielectric layer of different refractive index $n_c$ (i.e, 1.42, 1.43 and 1.44). As can be seen from the graph, the curves of the radiation patterns are gentler as the refractive indices $n_c$ of the second dielectric layers are smaller (i.e., 1.44→1.42).

Figure 15A:
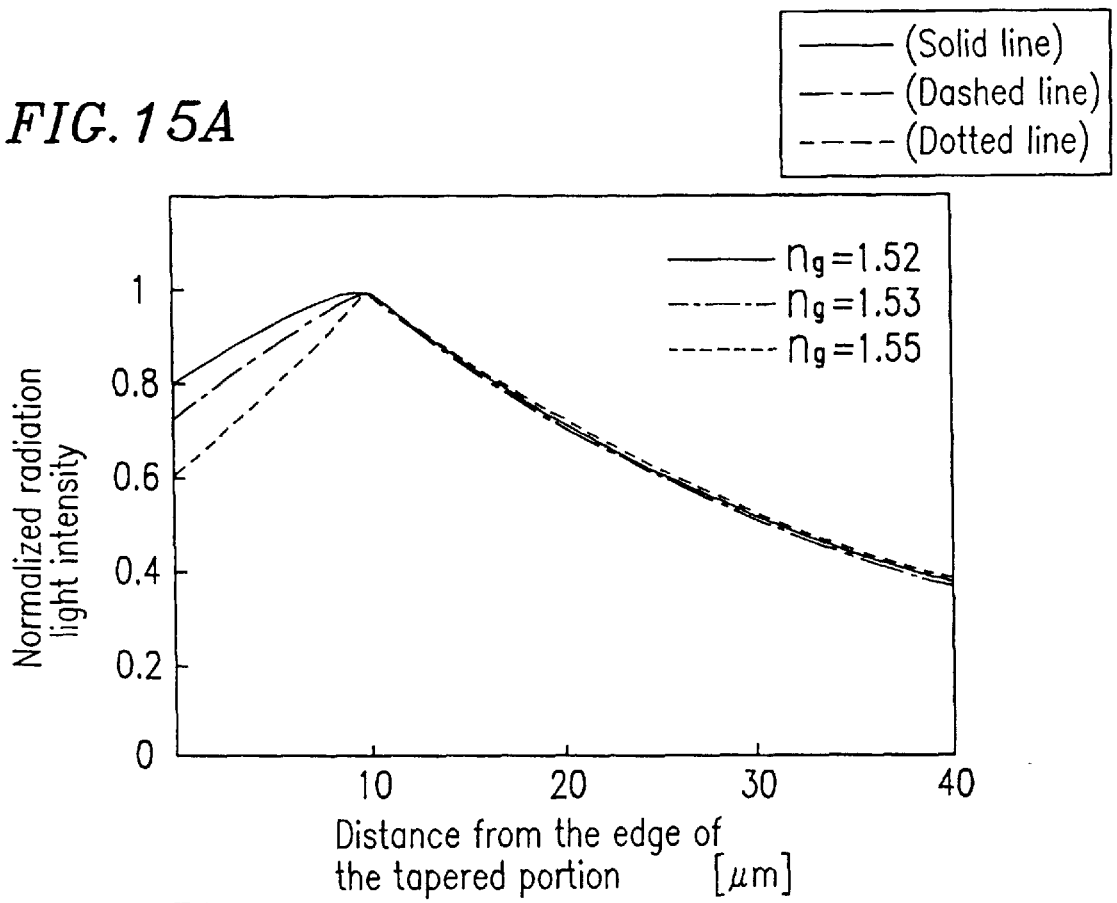
FIG. 15A is a graph showing radiation patterns of outgoing light from photocouplers each having a first dielectric layer of a different refractive index.

FIG. 15A is a graph showing radiation patterns of light output from photocouplers each having a waveguide layer of different refractive index $n_g$ (i.e., 1.52, 1.53 and 1.55). As can be seen from the graph, difference among the radiation patterns is substantially small and the curves of the radiation patterns are gentler as the refractive indices $n_g$ of the waveguide layer are smaller (i.e., 1.55→1.52).

Figure 15B:
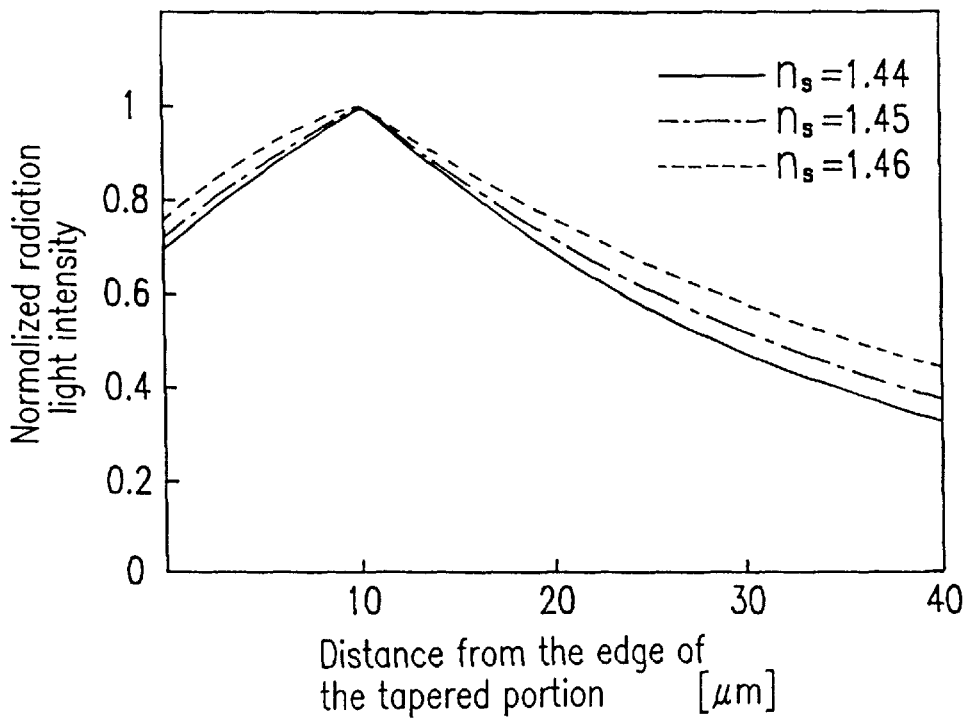
FIG. 15B is a graph showing radiation patterns of outgoing light from photocouplers each having a substrate of a different refractive index.

FIG. 15B is a graph showing radiation patterns of light output from photocouplers each having a dielectric portion of a different refractive index $n_s$ (i.e., 1.44, 1.45 and 1.46) in the substrate of the waveguide. As can be seen from the graph, the difference among the radiation patterns is substantially small. However, the curves of the radiation patterns are gentler as the refractive indices $n_s$ of the dielectric portion are larger (i.e., 1.44→1.46).

Figure 16A:
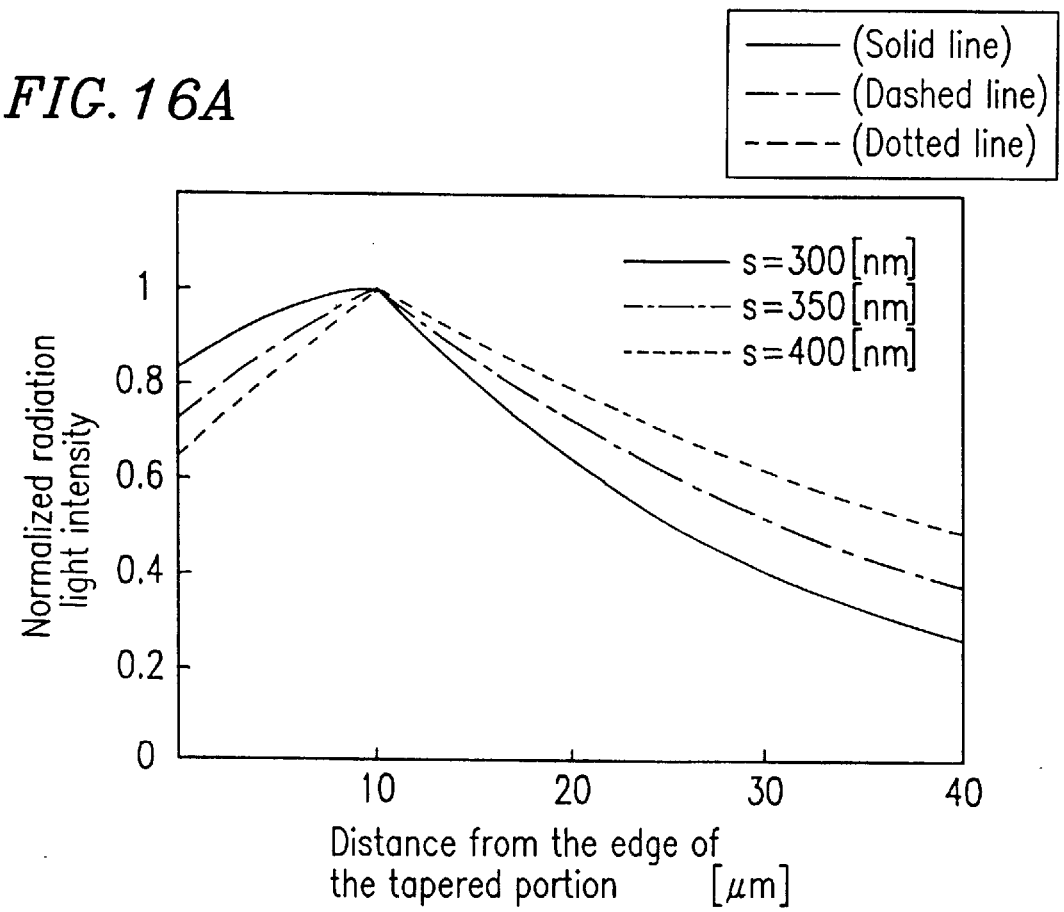
FIG. 16A is a graph showing radiation patterns of outgoing light from photocouplers each having a second dielectric layer of a different thickness s.

FIG. 16A is a graph showing radiation patterns of light output from photocouplers each having a second dielectric layer of different thickness s (i.e., 300 nm, 350 nm and 400 nm). As can be seen from the graph, the curves of the radiation patterns are gentler as the maximum thicknesses s are larger (i.e., 300 nm→400 nm).

Figure 16B:
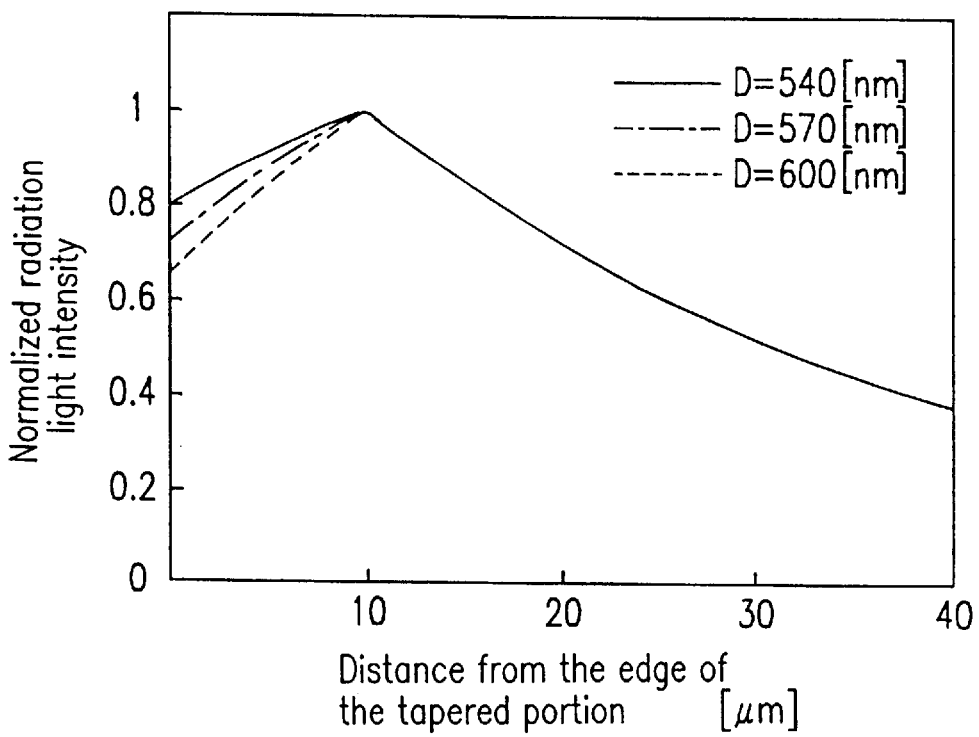
FIG. 16B is a graph showing radiation patterns of outgoing light from photocouplers each having a first dielectric layer of a different maximum thickness.

FIG. 16B is a graph showing radiation patterns of light output from photocouplers each having a waveguide layer of different maximum thickness D (i.e., 540 nm, 570 nm and 600 nm). As can be seen from the graph, the curves of the radiation patterns are gentler as the minimum thicknesses D are smaller (i.e., 600 nm→540 nm)

Figure 17A:
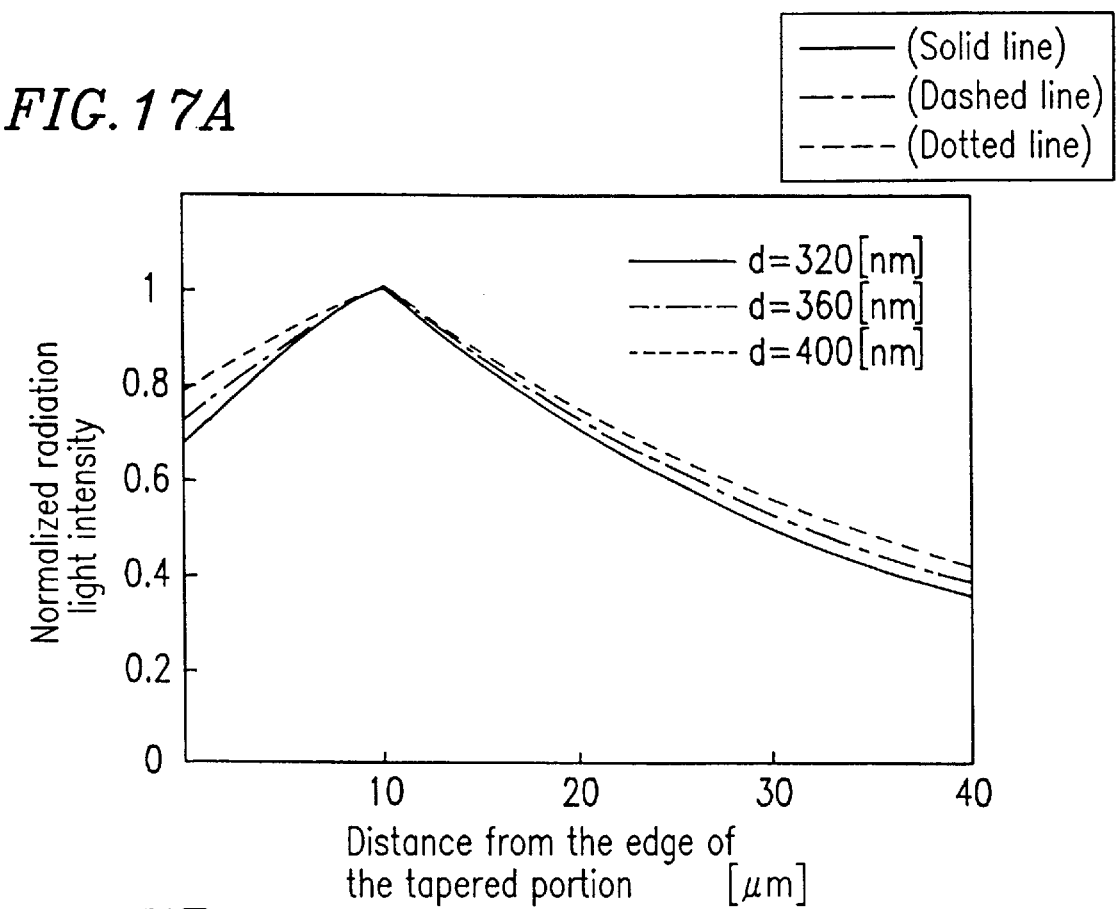
FIG. 17A is a graph showing radiation patterns of outgoing light from photocouplers each having a first dielectric layer of a different minimum thickness.
Figure 17B:
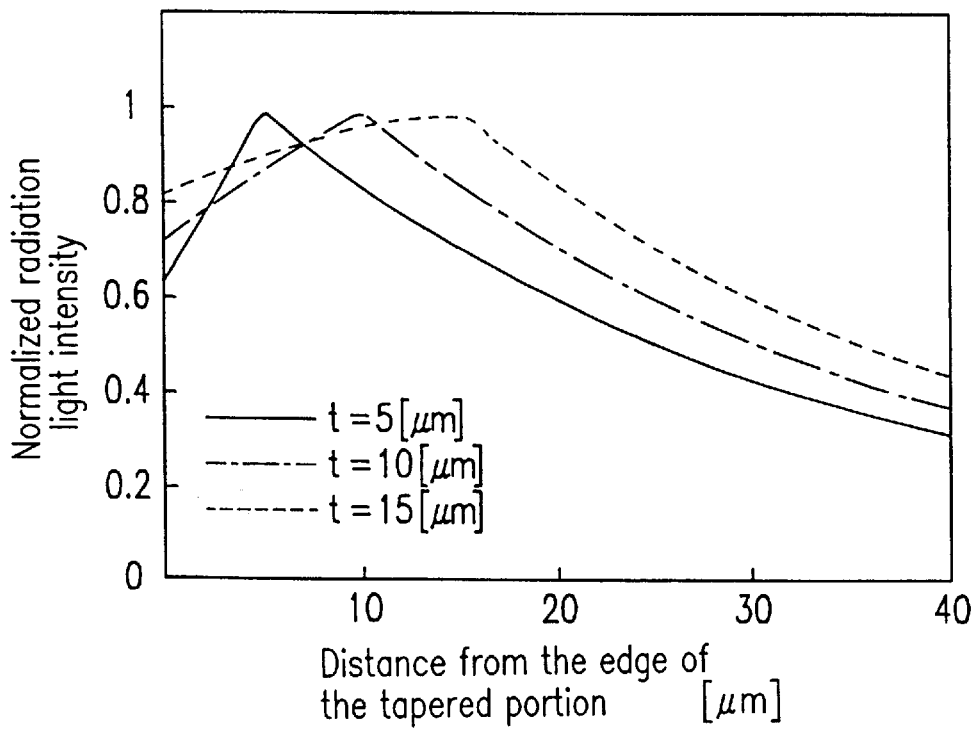
FIG. 17B is a graph showing radiation patterns of outgoing light from photocouplers each having a different taper length.

FIG. 17A is a graph showing radiation patterns of light output from photocouplers each having the waveguide layer of different minimum thickness d (i.e., 320 nm, 360 nm and 400 nm). The difference among the radiation patterns is substantially insignificant. However, the curves of the radiation patterns are gentler as the thicknesses d are larger (i.e., 320 nm→400 nm).

Accordingly, when the taper length t is 10 μm, in order to satisfy the above expression (1), and to obtain substantially optimum radiation pattern, the following conditions may be effective and are preferred:

$1.56 < n_b < 1.58$ $1.42 < n_c < 1.44$ $1.52 < n_g < 1.55$ $1.44 < n_s < 1.46$ $300 \text{ [nm]} < s < 400 \text{ [nm]}$ $540 \text{ [nm]} < D < 600 \text{ [nm]}$ $320 \text{ [nm]} < d < 400 \text{ [nm]}$ However, in fact, in the case where all of the above-described parameters are selected only for obtaining the varied type radiation pattern having a maximum point in the midway with gentle curves declining in Y-direction on both sides, even the above expression (1) will not be fulfilled. Accordingly, various combinations of substantially optimum ranges of the parameters are set for a predetermined refractive index $n_g$ of the waveguide layer and a predetermined thickness s of the second dielectric layer.

Figure 18:
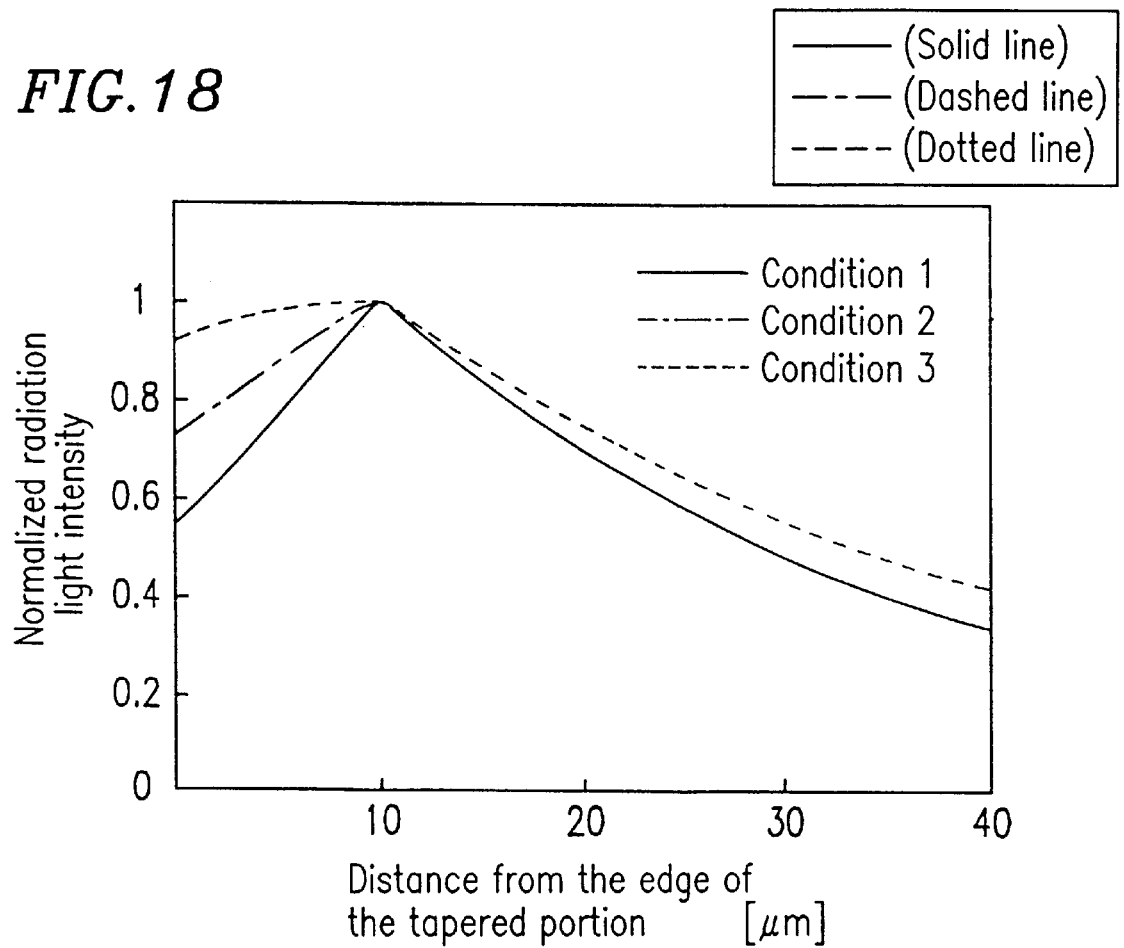
FIG. 18 is a graph showing radiation patterns of outgoing light from photocouplers under different conditions 1, 2 and 3.

Condition 1: $n_b$=1.58, $n_c$=1.44, $n_g$=1.53, $n_s$=1.46, s=350 nm, D 540 nm, d=400 nm Condition 2: $n_b$=1.57, $n_c$=1.43, $n_g$=1.53, $n_s$=1.45, s=350 nm, D=570 nm, d=360 nm Condition 3: $n_b=1.56$, $n_c=1.42$, $n_g=1.53$, $n_s=1.44$, s=350 nm, D=600 nm, d=320 nm FIG. 18A is a graph illustrating radiation patterns of light output from photocouplers under the above Conditions 1, 2 and 3. As can be appreciated from the graph, the shapes of the radiation patterns are stable. Thus, the following Condition A is derived as one of the preferred effective structural conditions for a photocoupler when the taper length t is 10 μm:

Condition A:

$1.56 < n_b < 1.58$, $1.42 < n_c < 1.44$, $n_g = 1.53$, $1.44 < n_s < 1.46$, s=350 [nm],

540 [nm]<D<600 [nm], 320 [nm]<d<400 [nm]

Figure 19A:
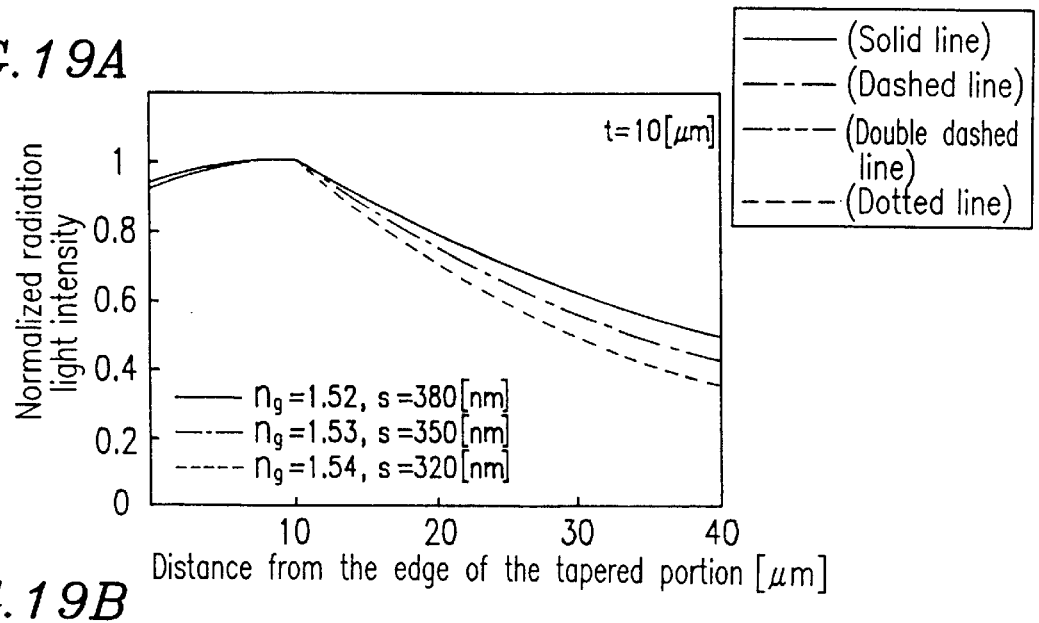
FIGS. 19A through 19C are graphs showing radiation patterns of outgoing light from photocouplers.

Preferred structural conditions can be determined in the similar manner in the cases where $n_g$ is 1.52, $n_g$ is 1.54 or the like. For example, as shown in FIG. 19A, radiation patterns obtained for photocouplers under the conditions where $n_g$ is 1.52 and s is 320 nm ($n_b=1.58$, $n_c=1.44$, $n_s=1.46$, D=540 nm, d=400 nm) and under the conditions where $n_g$ is 1.54 and s is 380 nm ($n_b=1.58$, $n_c=1.44$, $n_s=1.46$, D=540 nm, d=400 nm) are generally the same as that under Condition 1 shown in FIG. 18. Accordingly, the following conditions are also effective when the taper length t is 10 μm.

Condition B:

$1.56 < n_b < 1.58$, $1.42 < n_c < 1.44$, $n_g = 1.52$, $1.44 < n_s < 1.46$, s=380 [nm],

540 [nm]<D<600 [nm], 320 [nm]<d<400 [nm]

Condition C:

$1.56 < n_b < 1.58$, $1.42 < n_c < 1.44$, $n_g = 1.54$, $1.44 < n_s < 1.46$, s=320 [nm],

540 [nm]<D<600 [nm], 320 [nm]<d<400 [nm]

The following relationship between the thickness s of the second dielectric layer and the refractive index $n_g$ of the waveguide layer is derived from Conditions A, B and C.

$s = 3000(1.53 - n_g) + 350$ [nm]

Thus, when the taper length t is 10 μm, the following structural conditions are preferable:

Condition D:

$1.56 < n_b < 1.58$, $1.42 < n_c < 1.44$, $1.44 < n_s < 1.46$, 540 [nm] <D<600 [nm],

320[nm]<d<400 [nm], $1.52 < n_g < 1.54$ where, $s = 3000(1.53 - n_g) + 350$ [nm]

Figure 19B:
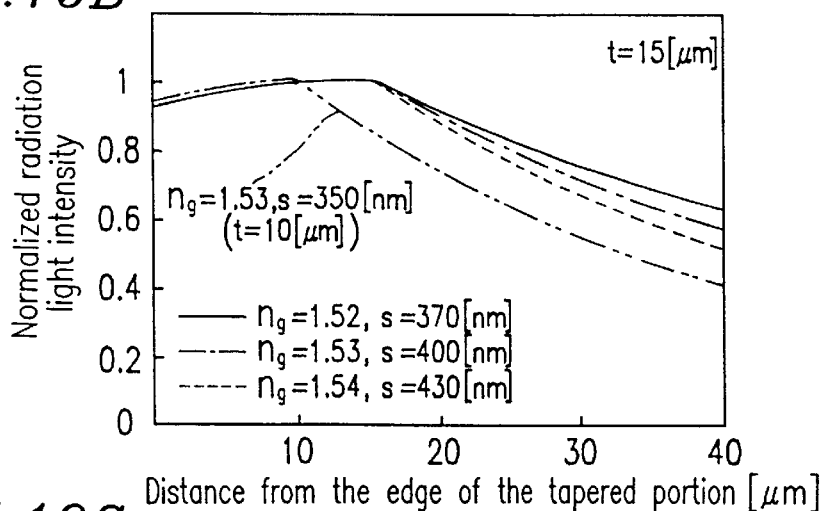

Even when the taper length t is made longer than 10 μm, the present invention is applicable for an incident beam spot diameter of 30 μm, although the coupling efficiency may be reduced. In this case, however, since the shape of the radiation pattern becomes flatter, it is advantageous in that the coupling efficiency becomes higher for the incident beam spot diameter of more than 30 μm. FIG. 19B is a graph showing radiation patterns of light output from photocouplers having the taper length t of 15 μm. As can be appreciated from the graph, where $n_g$ is 1.53, $n_b$ is 1.58, $n_c$ is 1.44, $n_s$ is 1.46, D is 540 nm and d is 400 nm, a radiation pattern of light output from a photocoupler with a thickness s of 400 nm has a flatter shape than the shape of the radiation pattern of light output from the photocoupler under Condition A (FIG. 19A). Furthermore, a similar radiation pattern is obtained under the conditions where $n_g$ is 1.52 ($n_b=1.58$, $n_c=1.44$, $n_s=1.46$, D=540 nm, d=400 nm) when s is 430 nm, and under the conditions where $n_g$ is 1.54 ($n_b=1.58$, $n_c=1.44$, $n_s=1.46$, D=540 nm, d=400 nm) when s is 430 nm. Thus, following Condition E provides the preferable structural conditions in the case where the taper length t is 15 μm:

Condition E:

$1.56 < n_b < 1.58$, $1.42 < n_c < 1.44$, $1.44 < n_s < 1.46$, 540 [nm] <D<600 [nm],

320 [nm]<d<400 [nm], $1.52 < n_g < 1.54$ where, $s = 3000(1.53 - n_g) + 400$ [nm]

Figure 19C:
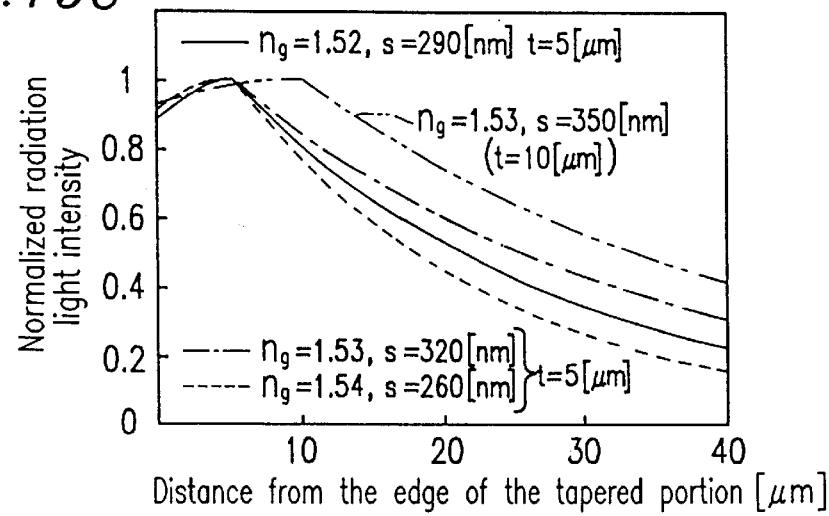
Figure 20:
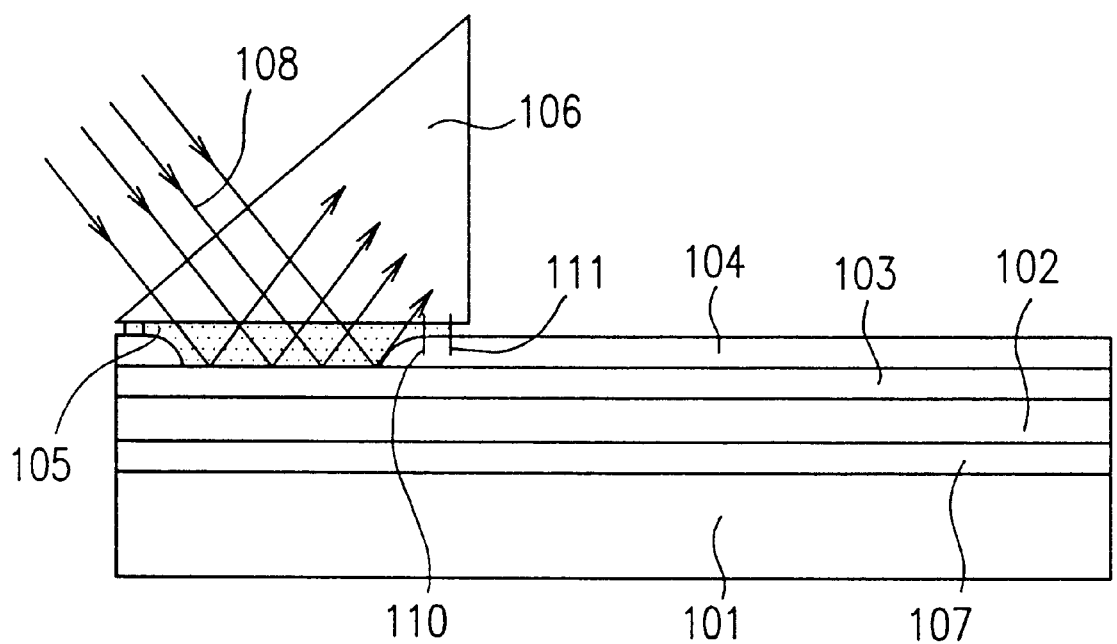
FIG. 20 is a cross-sectional view showing an example of a conventional photocoupler.

On the contrary, even when the taper length t is made shorter than 10 μm, the present invention is applicable for an incident beam spot diameter of 30 μm, although the coupling efficiency may be reduced. In this case, however, since the shape of the radiation pattern becomes steeper, it is advantageous in that the coupling efficiency becomes higher for an incident beam spot diameter of less than 30 μm. FIG. 19C is a graph showing radiation patterns of light output from photocouplers having the taper length t of 5 μm. As can be appreciated from the graph, where $n_g$ is 1.53, $n_b$ is 1.58, $n_c$ is 1.44, $n_s$ is 1.46, D is 540 nm and d is 400 nm, a radiation pattern of light output from a photocoupler with a thickness s of 290 nm has a steeper shape than the shape of the radiation pattern of light output from the photocoupler under Condition A. Furthermore, a similar radiation pattern is obtained under the conditions where $n_g$ is 1.52 ($n_b=1.58$, $n_c=1.44$, $n_s=1.46$, D=540 nm, d=400 nm) when s is 320 nm, and under the conditions where $n_g$ is 1.54 ($n_b=1.58$, $n_c=1.44$, $n_s=1.46$, D=540 nm, d=400 nm) when s is 260 nm. Thus, following Condition F provides the preferable structural conditions in the case where the taper length t is 5 μm:

Condition F:

$1.56 < n_b < 1.58$, $1.42 < n_c < 1.44$, $1.44 < n_s < 1.46$, 540 [nm] <D<600 [nm],

320 [nm]<d<400 [nm], $1.52 < n_g < 1.54$ where, $s = 3000(1.53 - n_g) + 290$ [nm]

Thus, in view of the taper length t [nm], s, $n_g$ and t can be expressed as follows:

$s = 3000(1.53 - n_g) + T$, $T = 1000(t - 0.01) + 350$ [nm]

Finally, Condition G is derived from the above-described conditions as the structural conditions of a photocoupler according to the present invention:

Condition G:

$1.56 < n_b < 1.58$, $1.42 < n_c < 1.44$, $1.44 < n_s < 1.46$, 540 [nm] <D<600 [nm],

320 [nm]<d<400 [nm], $1.52 < n_g < 1.54$ where, $s = 3000(1.53 - n_g) + T$ [nm]

$T = 1000(t - 0.01) + 350$ [nm]

(5 [μm]<t<15 [μm])

It should be noted that the each of the above-described conditions were obtained upon simulations conducted by the present inventors.

According to a method for producing a photocoupler of the present invention, the adhesive used preferably has a refractive index of 1.56 to 1.58 due to limitations on the refractive index and the transmission characteristics, and a second dielectric layer (cladding layer) is preferably made of, for example, $SiO_2$ which has a refractive index of 1.42 to 1.44. The waveguide layer (first dielectric layer) is preferably made of #7059 glass or SiON which has a refractive index of 1.52 to 1.56. Furthermore, such devices are generally formed on an Si substrate (on which a dielectric layer such as an $SiO_2$ layer is formed), a quartz glass substrate with small absorption or the like, which has a refractive index of 1.44 to 1.45

Determining the shape of the tapered structure under such conditions, radiation characteristics close to the high radiation characteristics shown in FIGS. 5A and 5B can be obtained for each of the cases shown in FIGS. 14A, 14B, 15A, 15B, 16A, 16B, 17A and 17B. Since materials used for producing a photocoupler according to the present invention may be determined beforehand, the above-described conditions obtained from FIGS. 14A, 14B, 15A, 15B, 16A, 16B, 17A and 17B are preferably considered as ideal conditions for the shape of the tapered structure.

Thus, the conditions for the shape of the tapered structure will preferably be:

5 [pm]<t<15 [µm], 300 [nm]<s<400 [nm],
540 [nm]<D<600 [nm], 320 [nm]<d<400 [nm]

According to a photocoupler of the present invention, a varied type radiation pattern is obtained such that the photocoupler almost uniformly outputs light with a uniform intensity in the direction of light propagation in the optical waveguide. Accordingly, allowable incident position area with respect to the coupling efficiency can be enlarged.

The bonding section has an edge surface which makes contact with the surface of the waveguide in a straight line and which has a portion which makes contact with neither the light incidence component nor the surface of the optical waveguide. Therefore, the edge of the tapered portion of the first dielectric layer and the line at which the edge surface of the bonding section and the surface of the waveguide make contact with each other can be accurately positioned. Thus, any positional offset from the optimum distance between the edge of the tapered portion of the first dielectric layer and the edge surface of the bonding section can be easily eliminated, thereby minimizing reduction in the coupling efficiency.

According to a photocoupler of the present invention, a preferable range of the shape of the tapered structure can be determined.

According to a photocoupler of the present invention, when a height h of the edge surface of the bonding section from the surface of the waveguide fulfills the above expression (2), the bonding section is completely prevented from acting as a thin film that causes an unstable coupling efficiency due to multiple reflection at the interface between the adhesive and the bottom surface of the prism.

According to a photocoupler of the present invention, a dielectric plate is used instead of a prism. Thus, a production cost can be lowered.

According to a photocoupler of the present invention, the surface of the dielectric plate is provided with a non-reflective coating. Accordingly, reflected light can be reduced.

According to a method of the present invention, the position of the contact line where the edge portion of the adhesive and the surface of the optical waveguide make contact with each other may be adjusted with respect to the edge of the tapered portion of the first dielectric layer by photolithography. Thus, the distance between the line where the edge of the bonding section makes contact with the surface of the optical waveguide, and the edge of the tapered portion of the first dielectric layer can be accurately set. Furthermore, the straightness of the line between the edge of the bonding section and the surface of the optical waveguide can be realized using a photomask.

According to the present invention, a grooved photoresist is provided on a surface of the waveguide and the prism is positioned on the photoresist so as to cross over the groove. By doing so, the prism will make contact with the photoresist at two positions, whereby the bottom surface of the prism is placed in a more parallel relationship with the surface of the waveguide. The base angle φ of the prism (which is determined to minimize the reflectance of the light which is incident at such an optimum incidence angle that maximizes the coupling efficiency) is prevented from being offset with respect to the angle between the surface of the waveguide and the incidence angle. Thus, the reduction in the coupling efficiency which is caused by the offset of the incidence angle with respect to the optimum incidence angle is controlled.

According to the method of the present invention, by setting the thickness W of the photoresist to be greater than a height h of the edge surface of the bonding section from the surface of the optical waveguide, the bonding section can be prevented from acting as a thin film.

According to the method of the present invention, in a step after formation of the groove on the photoresist, an RIE process (an oxygen plasma process) is preferably performed in order to remove organic residues of the photoresist developer which have been left on the surface of the waveguide in the groove forming step and also in order to remove a denatured surface layer of the waveguide. Such a process increases the bonding force of the prism onto the waveguide.

According to the method of the present invention, the adhesive is preferably a photo-curable material which is advantageous in that the time period required for fixing the prism is shorter and thus the reduction in coupling efficiency caused by, for example, the positional offset of the prism while the prism is being fixed is minimized.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A photocoupler, comprising:
an optical waveguide including a substrate, at least a first dielectric layer provided on the substrate, the first dielectric layer having a tapered structure whose thickness varies in an x-direction in which light is propagated after coupling, and a second dielectric layer provided on the first dielectric layer;
a light incidence component provided above the optical waveguide, which causes light incident thereon to be directed toward a surface of the optical waveguide at a prescribed angle; and
a bonding section for bonding the light incidence component to the optical waveguide,
wherein the bonding section has an edge surface which makes contact with the surface of the waveguide in a straight line and has a portion which makes contact with neither the light incidence component nor the surface of the optical waveguide; and
the tapered structure of the first dielectric layer has a shape set such that a radiation pattern of light with a wavelength λ output from the optical waveguide of the photocoupler fulfills the following expression (1):

$$a_{n-1}(1-r_n) < a_n(1-r_{n+1}) \qquad \text{expression (1)}$$

where $_m$ is a radiation coefficient at a section $X_{n-1} < X < X_n$ of the first dielectric layer where a thickness thereof varies in a tapering manner; $a_n$ is an amplitude at a distance $X_n$ from the edge surface of the bonding section; and $r_n$ is $\exp(k_o{}_m \Delta X)$; $k_o$ is $2\pi/\lambda$; and $\Delta X$ is $X_n - X_{n-1}$; and wherein:
$a_{n-1}$ is the amplitude at a distance $X_{n-1}$ from the edge of the bonding section,
$r_{n+1} = \exp(k_o{}_{r(n+1)} \Delta X)$,
r(n+1) is a radiation coefficient at section $X_n < X < X_{n+1}$, and
$X_{n+1} = X_n + \Delta X$.

2. A photocoupler according to claim 1, wherein the shape of the tapered structure is set such that a taper length t of the tapered structure, a thickness s of the second dielectric layer, a maximum thickness D of the first dielectric layer and a minimum thickness d of the first dielectric layer fulfill the following conditions:

5 [μm]<t<15 [μm], 300 [nm]<s<400 [nm],

540 [nm]<D<600 [nm], 320 [nm]<d<400 [μm].

3. A photocoupler according to claim 1, wherein a height h of the edge surface of the bonding section from the surface of the optical waveguide is set so as to fulfill the following expression (2):

$$h > 2r_A/\sin \theta_1' \qquad \text{expression (2)}$$

where $r_A$ is an Airy radius of an incident beam spot and $\theta_1'$ is an incidence angle with respect to the surface of the optical waveguide.

4. A photocoupler according to claim 1, wherein the light incidence component is a prism.

5. A photocoupler according to claim 1, wherein the light incidence component is a dielectric plate.

6. A photocoupler according to claim 5, wherein the surface of the dielectric plate is provided with a non-reflective coating.

7. A method for producing a photocoupler of claim 1, comprising the steps of:

applying a photoresist on a surface of the optical waveguide;

forming a groove in the photoresist;

injecting an adhesive into the groove;

positioning and adjusting a light incidence component on the surface of the photoresist;

bonding and fixing the light incidence component on the surface of the optical waveguide; and removing the photoresist.

8. A method for producing a photocoupler of claim 4, comprising the steps of:

applying a photoresist on a surface of the optical waveguide;

forming a groove in the photoresist;

injecting an adhesive into the groove;

positioning and adjusting the prism on the surface of the waveguide structure crossing over the groove;

bonding and fixing the prism on the surface of the optical waveguide; and removing the photoresist.

9. A method for producing a photocoupler according to claim 7, wherein the thickness W of the photoresist is set to fulfill the relationship:

$$w > h$$

where, h is a height of the edge surface of the bonding section from the surface of the waveguide.

10. A method for producing a photocoupler according to claim 7, further comprising, after the step of forming a groove in the photoresist, a step of performing an RIE process on the surface of the waveguide.

11. A method for producing a photocoupler according to claim 7, wherein the step of bonding and fixing the light incidence component on the surface of the waveguide is performed using a photo-curable adhesive.

* * * * *